(12) United States Patent
Tumen

(10) Patent No.: US 7,840,479 B2
(45) Date of Patent: Nov. 23, 2010

(54) METHOD AND APPARATUS FOR DISPLAY OF DATA WITH RESPECT TO CERTAIN TRADABLE INTERESTS

(76) Inventor: Steven N. Tumen, 111 W. Jackson, #2000, Chicago, IL (US) 60604

( * ) Notice: Subject to any disclaimer, the term of this patent is extended or adjusted under 35 U.S.C. 154(b) by 719 days.

(21) Appl. No.: 11/418,712

(22) Filed: May 5, 2006

(65) Prior Publication Data

US 2007/0005485 A1    Jan. 4, 2007

Related U.S. Application Data

(60) Provisional application No. 60/678,016, filed on May 5, 2005, provisional application No. 60/700,677, filed on Jul. 19, 2005.

(51) Int. Cl.
*G06Q 40/00* (2006.01)
(52) U.S. Cl. .................. 705/37; 705/35; 705/36 R; 705/36 T
(58) Field of Classification Search .............. 705/35–37
See application file for complete search history.

(56) References Cited

U.S. PATENT DOCUMENTS

| | | | | |
|---|---|---|---|---|
| 5,101,353 | A * | 3/1992 | Lupien et al. ................. | 705/37 |
| 7,020,251 | B2 * | 3/2006 | Zirngibl et al. .......... | 379/88.17 |
| 7,089,206 | B2 * | 8/2006 | Martin ........................ | 705/37 |
| 7,177,833 | B1 * | 2/2007 | Marynowski et al. ......... | 705/38 |
| 7,251,629 | B1 * | 7/2007 | Marynowski et al. ......... | 705/37 |
| 7,330,831 | B2 * | 2/2008 | Biondi et al. .............. | 705/36 T |
| 7,356,500 | B1 * | 4/2008 | Waelbroeck et al. .......... | 705/37 |
| 7,401,048 | B2 * | 7/2008 | Rosedale et al. ............. | 705/37 |
| 7,533,054 | B2 * | 5/2009 | Hausman et al. ............. | 705/37 |
| 7,536,340 | B2 * | 5/2009 | Dheer et al. ................. | 705/37 |
| 2001/0003179 | A1 * | 6/2001 | Martyn et al. ................ | 705/37 |
| 2002/0055886 | A1 * | 5/2002 | Hinckley .................... | 705/26 |
| 2002/0138390 | A1 * | 9/2002 | May ............................ | 705/37 |
| 2002/0156716 | A1 * | 10/2002 | Adatia ......................... | 705/37 |
| 2002/0174056 | A1 * | 11/2002 | Sefein et al. .................. | 705/37 |
| 2002/0188548 | A1 * | 12/2002 | Bunda ......................... | 705/37 |
| 2003/0065608 | A1 * | 4/2003 | Cutler ......................... | 705/37 |
| 2003/0069834 | A1 * | 4/2003 | Cutler ......................... | 705/37 |
| 2003/0105697 | A1 * | 6/2003 | Griffin et al. .................. | 705/36 |
| 2003/0110113 | A1 * | 6/2003 | Martin ........................ | 705/36 |
| 2003/0139990 | A1 * | 7/2003 | Greco ......................... | 705/35 |
| 2005/0015321 | A1 * | 1/2005 | Vindekilde .................. | 705/37 |
| 2005/0021443 | A1 * | 1/2005 | Beard et al. .................. | 705/37 |
| 2005/0080711 | A1 * | 4/2005 | Mah ............................ | 705/37 |

(Continued)

*Primary Examiner*—Narayanswamy Subramanian
(74) *Attorney, Agent, or Firm*—Schiff Hardin LLP

(57) ABSTRACT

Computer display of exchange traded option trading system includes sorting information received from the exchange to provide the liquidity provider with trading opportunities based on the liquidity provider's portfolio. A first display provides a comparison of theoretical values to market pricing values for tradable interests in the portfolio and displays in sorted order tradable interests for which values are most out of line. In another display, pricing data of tradable interests in the portfolio as received from a primary exchange are compared to pricing data on other exchanges, and a listing is provided of tradable interests in which values are crossed, are the same (locked) or are one trade increment away from one another. In a third display, pricing values on any exchange for tradable interests in the portfolio that are crossed with the pricing value on any other exchange are shown. Trade entry is possible from the displays.

5 Claims, 30 Drawing Sheets

U.S. PATENT DOCUMENTS

| | | | |
|---|---|---|---|
| 2005/0187855 A1* | 8/2005 | Brennan et al. | 705/37 |
| 2005/0187862 A1* | 8/2005 | Dheer et al. | 705/39 |
| 2006/0015425 A1* | 1/2006 | Brooks | 705/35 |
| 2006/0136326 A1* | 6/2006 | Heckman et al. | 705/37 |
| 2006/0173769 A1* | 8/2006 | Vales | 705/37 |
| 2007/0022054 A1* | 1/2007 | Tumen | 705/45 |
| 2008/0243666 A1* | 10/2008 | Rowan | 705/37 |
| 2008/0288329 A1* | 11/2008 | Nannis et al. | 705/10 |
| 2009/0186689 A1* | 7/2009 | Hughes et al. | 463/25 |
| 2009/0292632 A1* | 11/2009 | Dheer et al. | 705/35 |
| 2010/0174664 A1* | 7/2010 | Kelly et al. | 705/36 R |
| 2010/0174665 A1* | 7/2010 | Lanng | 705/36 R |

* cited by examiner

OutOfLine

△ ClickTrade Products Expirations Exchanges Filter

| Name | Date | Strk | Type | bid | Bid | Theo | Ask | ask | Dlt | Vega | Price |
|------|------|------|------|-----|-----|------|-----|-----|-----|------|-------|
| PMV | Sep05 | 20 | Call | 10 | 5.20 | | 5.70 | 10 | +0 | +0.0 | |
| ADBE | Jan08 | 85 | Put | 21 | 56.00 | 56.19 | 52.20 | 26 | -100 | +0.0 | 56.19 |
| ADBE | Jan08 | 75 | Put | 75 | 46.00 | 46.19 | 42.20 | 26 | -100 | +0.0 | 46.19 |
| ADBE | Jan08 | 65 | Put | 74 | 36.00 | 36.19 | 32.20 | 26 | -100 | +0.0 | 36.19 |
| ADBE | Jan08 | 55 | Put | 75 | 26.00 | 26.19 | 22.20 | 26 | -100 | +0.0 | 26.19 |
| PMV | Sep05 | 22½ | Call | 10 | 2.80 | | 3.20 | 10 | +0 | +0.0 | |
| ADBE | Jan08 | 55 | Call | 21 | 1.65 | 0.67 | 0.90 | 10 | +11 | +10.0 | 0.67 |
| PMV | Sep05 | 25 | Call | 10 | 0.70 | | 0.95 | 10 | +0 | +0.0 | |
| TRI | Jan08 | 80 | Call | 10 | 2.05 | 2.65 | 2.15 | 10 | +16 | +26.9 | 2.65 |
| ADBE | Jan08 | 65 | Call | 21 | 0.70 | 0.26 | 0.40 | 20 | +4 | +5.6 | 0.26 |
| SUN | Jan08 | 130 | Put | 87 | 23.10 | 23.89 | 23.50 | 27 | -47 | +72.6 | 23.91 |
| CVH | Jan07 | 80.00 | Put | 18 | 12.60 | 13.22 | 12.90 | 84 | -57 | +33.2 | 13.22 |
| SUN | Jan08 | 135 | Put | 37 | 26.00 | 26.83 | 26.50 | 40 | -51 | +72.5 | 26.85 |
| TRI | Jan08 | 50 | Call | 10 | 11.90 | 11.60 | 12.20 | 10 | +73 | +29.1 | 11.59 |
| SUN | Jan07 | 125 | Call | 95 | 17.60 | 17.32 | 18.00 | 84 | +58 | +58.0 | 17.30 |
| SUN | Jan08 | 120 | Put | 91 | 17.80 | 18.57 | 18.30 | 28 | -38 | +71.0 | 18.58 |

*FIG. 4A*

| TSpd | Volu | Gamma | Theta | Rho | Last | PosValue | | OfrV |
|---|---|---|---|---|---|---|---|---|
| 56.19 | 0 | +0.01 | +50.0 | +0.0 | | 0 | 5.20 | 5.20 |
| 46.19 | 0 | +0.11 | +0.0 | +0.0 | 52.80 | 0 | 3.98 | 3.98 |
| 36.19 | 0 | +0.16 | +0.0 | +0.0 | 34.70 | 0 | 3.98 | 3.98 |
| 26.19 | 0 | +0.21 | +0.0 | +0.0 | 22.30 | 0 | 3.98 | 3.98 |
| | 0 | +0.24 | +0.0 | +0.0 | 1.05 | 0 | 3.98 | 3.99 |
| 0.67 | 0 | +0.01 | +50.0 | +0.0 | 0.60 | 0 | 2.80 | 2.80 |
| | 10 | +1.51 | -0.3 | +7.7 | 0.75 | 0 | 0.98 | 0.98 |
| 2.65 | 0 | +0.01 | +50.0 | +0.0 | | 0 | 0.70 | 0.70 |
| 0.26 | 0 | +1.54 | -0.6 | +26.0 | 0.30 | 0 | 0.50 | 0.50 |
| 23.89 | 0 | +0.65 | -0.1 | +3.5 | 26.80 | 0 | 0.44 | 0.44 |
| 2.81 | 30 | +0.45 | -1.0 | -117.5 | 12.80 | 0 | 0.38 | 0.39 |
| 26.83 | 0 | +1.00 | -0.8 | -43.8 | 25.80 | 0 | 0.32 | 0.32 |
| 2.66 | 0 | +0.41 | -1.0 | -122.8 | | 0 | 0.31 | 0.33 |
| 7.29 | 1 | +1.73 | -1.0 | +60.5 | 18.10 | 0 | 0.28 | 0.30 |
| | 0 | +0.96 | -3.0 | +76.2 | | 0 | 0.26 | 0.28 |
| 3.49 | 0 | +0.45 | -1.0 | -106.9 | 21.00 | 0 | 0.25 | 0.27 |

*FIG. 4B*

FROM FIG. 4A

| | | | | | | | | | |
|---|---|---|---|---|---|---|---|---|---|
| PMV | Sep05 | 25 | | | | | | +0 +0.0 | 0.00 |
| SUN | Jan08 | 125 | Put | 10 | 0.25 | 21.13 | 0.50 | 10 | -42 +72.6 | 21.15 |
| CVH | Jan07 | 75.00 | Put | 34 | 20.50 | 10.31 | 20.90 | 102 | -47 +33.9 | 10.32 |
| SUN | Jan08 | 110 | Put | 11 | 9.80 | 13.99 | 10.10 | 86 | -31 +66.0 | 14.00 |
| SUN | Jan08 | 115 | Put | 91 | 13.30 | 16.19 | 13.80 | 32 | -34 +68.8 | 16.20 |
| TRI | Jan08 | 60 | Call | 91 | 15.50 | 6.91 | 16.00 | 68 | +51 +33.2 | 6.90 |
| TRI | Jan08 | 55 | Call | 10 | 7.10 | 9.01 | 7.40 | 10 | +63 +31.9 | 9.00 |
| TRI | Jan07 | 60 | Put | 10 | 9.20 | 10.59 | 9.50 | 10 | -68 +22.1 | 10.60 |
| LNCR | Jan08 | 50 | Call | 50 | 10.20 | 4.53 | 10.40 | 11 | +47 +26.5 | 4.52 |
| SUN | Jan08 | 105 | Put | 11 | 4.70 | 11.97 | 5.00 | 24 | -27 +62.4 | 11.98 |
| SUN | Feb06 | 115 | Call | 91 | 11.40 | 15.12 | 11.80 | 106 | +65 +35.2 | 15.10 |
| GCI | Jan07 | 70.00 | Call | 21 | 15.30 | 8.43 | 15.60 | 20 | +69 +31.8 | 8.41 |
| ADBE | Jan08 | 45 | Call | 10 | 8.60 | 1.80 | 9.00 | 52 | +27 +15.8 | 1.80 |
| SUN | Feb06 | 125 | Call | 20 | 1.95 | 10.03 | 2.10 | 78 | +51 +37.7 | 10.01 |
| AMLN | Jan07 | 17½ | Call | 21 | 10.20 | 8.46 | 10.40 | 5 | +79 +8.2 | 8.45 |
| TRI | Jan07 | 65 | Put | 36 | 8.20 | 14.47 | 8.30 | 10 | -82 +17.5 | 14.49 |
| SUN | Jan06 | 115 | Call | 10 | 13.90 | 14.43 | 14.30 | 186 | +66 +32.4 | 14.41 |
| TRI | Jan08 | 75 | Call | 21 | 14.60 | 3.25 | 15.00 | 10 | +22 +29.2 | 3.25 |
| | | | | 10 | 2.90 | | 3.10 | | | |

| | | | | | | | | FROM FIG. 4B |
|---|---|---|---|---|---|---|---|---|
| | | +0.01 | +50.0 | +0.0 | | 0 | 0.25 | 0.25 |
| 3.49 | 0 | +0.52 | -1.0 | -114.5 | 20.10 | 0 | 0.22 | 0.23 |
| 3.18 | 0 | +1.16 | -0.9 | -40.4 | 9.70 | 0 | 0.21 | 0.21 |
| 3.34 | 203 | +0.41 | -1.0 | -90.8 | | 0 | 0.18 | 0.19 |
| 3.45 | 0 | +0.45 | -1.0 | -99.4 | 16.20 | 0 | 0.17 | 0.19 |
| 2.41 | 0 | +2.45 | -1.0 | +49.7 | 9.00 | 0 | 0.17 | 0.19 |
| 2.63 | 0 | +2.24 | -1.0 | +55.9 | 11.80 | 0 | 0.17 | 0.19 |
| 1.39 | 0 | +2.04 | -0.5 | -30.9 | 9.00 | 0 | 0.16 | 0.17 |
| 1.53 | 0 | +2.79 | -0.7 | +36.8 | 5.20 | 0 | 0.16 | 0.17 |
| 3.19 | 10 | +0.42 | -1.0 | -82.4 | 11.60 | 0 | 0.16 | 0.18 |
| 0.69 | 0 | +1.31 | -4.3 | +35.7 | | 0 | 0.15 | 0.17 |
| 2.72 | 0 | +2.50 | -1.2 | +59.8 | 10.30 | 0 | 0.15 | 0.15 |
| 1.80 | 0 | +2.58 | -0.5 | +15.6 | 2.70 | 0 | 0.15 | 0.17 |
| 0.68 | 0 | +1.46 | -4.4 | +29.2 | 8.70 | 0 | 0.15 | 0.16 |
| 1.99 | 0 | +1.68 | -0.6 | +13.8 | 8.20 | 10 | 0.15 | 0.17 |
| 0.89 | 25 | +1.55 | -0.3 | -28.3 | | 0 | 0.15 | 0.17 |
| 1.88 | 0 | +1.43 | -4.6 | +32.8 | 13.20 | 0 | 0.15 | 0.17 |
| 3.25 | 0 | +1.86 | -0.7 | +30.6 | | 0 | 0.15 | 0.15 |

FROM FIG. 4C

| Time | Name | Date | Strike | Type | bid | Bid | Theo | Dlt | Ask | ask | Dlt | Id | Name |
|---|---|---|---|---|---|---|---|---|---|---|---|---|---|
| 11:56:01 | NTY | Jan06 | 30.00 | Call | 10 | 0.20 | 0.25 | +11 | 0.25 | 20 | +11 | 47329 | NTY |
| 11:28:00 | NRG | Sep05 | 35.00 | Call | 10 | 1.45 | 1.41 | +31 | 1.50 | 75 | +31 | 64482 | NRG |
| 11:57:06 | UNTD | Sep05 | 15.00 | Call | 10 | 0.10 | 0.11 | +8 | 0.15 | 11 | +8 | 64435 | UNTD |
| 11:57:06 | UNTD | Sep05 | 15.00 | Call | 10 | 0.10 | 0.11 | +8 | 0.15 | 36 | +8 | 64435 | UNTD |
| 11:57:06 | UNTD | Sep05 | 15.00 | Call | 10 | 0.10 | 0.11 | +8 | 0.15 | 32 | +8 | 64435 | UNTD |
| 11:49:40 | KOSP | Jan05 | 40 | Put | 5 | 0.15 | 0.21 | -4 | 0.20 | 10 | -4 | 65504 | KOSP |
| 11:36:48 | KOSP | May05 | 50 | Put | 20 | 0.35 | 0.47 | -13 | 0.40 | 10 | -13 | 63721 | KOSP |
| 09:31:31 | EIX | Jan06 | 17½ | Put | 25 | 0.05 | 0.02 | -0 | 0.10 | 10 | -0 | 43802 | EIX |
| 09:31:31 | EIX | Jan06 | 17½ | Put | 25 | 0.05 | 0.02 | -0 | 0.10 | 10 | -0 | 43802 | EIX |
| 09:31:24 | EIX | Oct05 | 22½ | Put | 20 | 0.05 | 0.01 | -0 | 0.10 | 20 | -0 | 64567 | EIX |
| 11:56:39 | EIX | Jul05 | 35 | Put | 25 | 0.70 | 0.71 | -30 | 0.75 | 20 | -30 | 64143 | EIX |
| 11:58:52 | VLO | Sep05 | 35 | Put | 35 | 0.10 | 0.12 | -1 | 0.15 | 59 | -1 | 65140 | VLO |
| 11:58:52 | VLO | Sep05 | 35 | Put | 195 | 0.10 | 0.12 | -1 | 0.15 | 59 | -1 | 65140 | VLO |
| 11:58:52 | VLO | Sep05 | 35 | Put | 229 | 0.10 | 0.12 | -1 | 0.15 | 59 | -1 | 65140 | VLO |
| 11:54:49 | VLO | Sep05 | 32½ | Put | 35 | 0.05 | 0.06 | -1 | 0.10 | 70 | -1 | 65139 | VLO |

*FIG. 6*

User = "Furman_1" #8 Started 05/04/2005 @ 06:55:06 : "!!! Version=Assumption(Deacti Trading Position Monitoring Windows R⟨ ▲  S⇕ O⇕ V⇕ Q⇕ P⇕ ☺    User Furman 1

△ Products Expirations | Exchanges

IDLE SECURITIES: — 160

| Time | Name | Name | St |  |  | | | Bid | Theo | Dlt | Ask |
|------|------|------|-----|---|---|---|---|-----|------|-----|-----|
| 12:32:06 | GSK | Jan07 | 45 | ✓ Amex | Put | 119 | | 1.55 | 1.26 | -14 | 1.60 |
| 12:32:06 | GSK | Jan07 | 45 | ✓ Box | Put | 186 | | 1.55 | 1.26 | -14 | 1.60 |
| 12:36:31 | GSK | Jan06 | 45 | ✓ Cboe | Put | 70 | | 0.20 | 0.18 | -3 | 0.25 |
| 12:36:31 | GSK | Jan06 | 45 | ✓ Ise | Put | 70 | | 0.20 | 0.18 | -3 | 0.25 |
| 12:36:31 | GSK | Jan06 | 45 | ✓ PCoast | Put | 66 | | 0.20 | 0.18 | -3 | 0.25 |
| 12:31:01 | GSK | Nov05 | 45 | ✓ Phlx | Put | 89 | | 0.90 | 0.90 | -17 | 0.95 |
| 12:31:01 | GSK | Nov05 | 45 | | Put | 118 | | 0.90 | 0.90 | -17 | 0.95 |
| 12:31:01 | GSK | Nov05 | 45 | | Put | 193 | | 0.90 | 0.90 | -17 | 0.95 |
| 12:31:01 | GSK | Nov05 | 45 | | Put | 70 | | 0.90 | 0.90 | -17 | 0.95 |
| 12:31:01 | GSK | Nov05 | 45 | | Put | 70 | | 0.90 | 0.90 | -17 | 0.95 |
| 12:31:01 | GSK | Nov05 | 45 | | Put | 70 | | 0.90 | 0.90 | -17 | 0.95 |
| 12:27:01 | GSK | Nov05 | 42½ | | Put | | | 0.55 | 0.54 | -11 | 0.60 |
| 12:27:01 | GSK | Nov05 | 42½ | | Put | | | 0.55 | 0.54 | -11 | 0.60 |
| 12:27:01 | GSK | Nov05 | 42½ | | Put | | | 0.55 | 0.54 | -11 | 0.60 |
| 12:27:01 | GSK | Nov05 | 42½ | | Put | | | 0.55 | 0.54 | -11 | 0.60 |
| 12:27:01 | GSK | Nov05 | 42½ | | Put | | | 0.55 | 0.54 | -11 | 0.60 |
| 12:27:01 | GSK | Nov05 | 42½ | | Put | | | 0.55 | 0.54 | -11 | 0.60 |

| OrderFlow | OrderBook | | TradeLog | | Account | | |
|---|---|---|---|---|---|---|---|
| OFT | OFT | 0 | Furman 1 | 0 | Furman 1 | 0 | 05/04/05 | 12:34:00 | vatedElectronicEyeOnSpeedBump) #17.135 of 08/11/2004(05/02/20...

'SEM' 'SYU'!!!

✕ Crossed  Locked  1 Away

| ask | Dlt | Id | Name |
|---|---|---|---|
| 10 | -14 | 63200 | GSK |
| 10 | -14 | 63200 | GSK |
| 10 | -3 | 64517 | GSK |
| 10 | -3 | 64517 | GSK |
| 10 | -3 | 64517 | GSK |
| 10 | -3 | 64517 | GSK |
| 10 | -17 | 64822 | GSK |
| 10 | -17 | 64822 | GSK |
| 10 | -17 | 64822 | GSK |
| 10 | -17 | 64822 | GSK |
| 10 | -17 | 64822 | GSK |
| 10 | -17 | 64822 | GSK |
| 10 | -11 | 64821 | GSK |
| 10 | -11 | 64821 | GSK |
| 10 | -11 | 64821 | GSK |
| 10 | -11 | 64821 | GSK |
| 10 | -11 | 64821 | GSK |
| 10 | -11 | 64821 | GSK |

FIG. 7D

FROM FIG. 7B

| | | |
|---|---|---|
| 10 | -11 | 64821 | GSK |
| 10 | -4 | 64819 | GSK |
| 10 | -4 | 64819 | GSK |
| 10 | -4 | 64819 | GSK |
| 10 | -4 | 64819 | GSK |
| 35 | -4 | 64819 | GSK |
| 45 | -4 | 64819 | GSK |
| 10 | -4 | 64819 | GSK |
| 25 | -2 | 64818 | GSK |
| 25 | -2 | 64818 | GSK |
| 10 | +24 | 64240 | GSK |
| 35 | -12 | 64237 | GSK |
| 35 | -12 | 64237 | GSK |
| 35 | -12 | 64237 | GSK |
| 10 | -12 | 64237 | GSK |
| 10 | -0 | 43802 | EIX |
| 10 | -0 | 43802 | EIX |
| 10 | +26 | 64574 | EIX |

| sk | CTSpd | CDlt | CPos | PDlt | PPos | ChVol | PBid | PAsk | PTheo | PTSpd | CVolu |
|---|---|---|---|---|---|---|---|---|---|---|---|
| | 86 | -233 | -2310 | | 2444 | 8.86 | 8.86 | | | | 8.86 |
| PCO | PLCE | RDA | SEM | SHFL | SVF | SVU | UCOMA | UNTD | VLO | WCI | WCN | ZQ |

162

FROM FIG. 7C

User = "Furman_1" #8 Started 05/04/2005 @ 06:55:06 : "!!! Version=Assumption(Deacti... | S⇕ O⇕ V⇕ Q⇕ P⇕ ☺ | User Furman 1

☐ ⇨ Trading Position Monitoring Windows R⇣ ▲

IDLE SECURITIES:  ⟵ 168

| Time | Name | | | | Bid | Theo | Dlt | Ask |
|---|---|---|---|---|---|---|---|---|
| | | Products | Expirations | Exchanges | | | | |
| 09:31:31 | EIX | | ✓ 2005/05/21 | | 0.05 | 0.02 | -0 | 0.10 |
| 09:31:31 | EIX | | ✓ 2005/06/18 | | 0.05 | 0.02 | -0 | 0.10 |
| 12:39:32 | VLO | | ✓ 2005/07/16 | | 0.50 | 0.55 | -4 | 0.55 |
| 12:32:06 | GSK | | ✓ 2005/08/20 | | 1.55 | 1.26 | -14 | 1.60 |
| 12:32:06 | GSK | | ✓ 2005/09/17 | | 1.55 | 1.26 | -14 | 1.60 |
| 11:49:40 | KOSP | | ✓ 2005/10/22 | | 0.15 | 0.18 | -4 | 0.20 |
| 12:26:59 | NRG | all | ✓ 2005/11/19 | | 1.45 | 1.40 | +31 | 1.50 |
| 12:40:45 | GSK | ut | ✓ 2005/12/17 | | 0.85 | 0.65 | -7 | 0.90 |
| 12:40:45 | GSK | ut | ✓ 2006/06/21 | | 0.85 | 0.65 | -7 | 0.90 |
| 12:38:00 | EIX | all | ✓ 2007/01/20 | | 0.70 | 0.80 | +26 | 0.75 |
| 12:38:00 | EIX | all | | | 0.70 | 0.80 | +26 | 0.75 |
| 12:41:26 | GSK | ut | Jan06 | 35 Put | 0.20 | 0.18 | -3 | 0.25 |
| 12:41:26 | GSK | Put | Jan06 | 35 Put | 0.20 | 0.18 | -3 | 0.25 |
| 12:41:26 | GSK | Put | Jan06 | 35 Put | 0.20 | 0.18 | -3 | 0.25 |
| 12:31:01 | GSK | Put | Nov05 | 45 Put | 0.90 | 0.90 | -17 | 0.95 |
| 12:31:01 | GSK | Put | Nov05 | 45 Put | 0.90 | 0.90 | -17 | 0.95 |
| 12:31:01 | GSK | Put | Nov05 | 45 Put | 0.90 | 0.90 | -17 | 0.95 |
| 12:42:16 | VLO | Call | Sep05 | 85 Call | 2.85 | 2.51 | +23 | 2.90 |

| ask | Dlt | Id | Name |
|---|---|---|---|
| 10 | -0 | 43802 | EIX |
| 10 | -0 | 43802 | EIX |
| 1 | -4 | 65179 | VLO |
| 10 | -14 | 63200 | GSK |
| 10 | -14 | 63200 | GSK |
| 10 | -4 | 65004 | KOSP |
| 75 | +31 | 64482 | NRG |
| 10 | -7 | 64518 | GSK |
| 10 | -7 | 64518 | GSK |
| 10 | +26 | 64574 | EIX |
| 10 | +26 | 64574 | EIX |
| 10 | -3 | 64517 | GSK |
| 10 | -3 | 64517 | GSK |
| 10 | -3 | 64517 | GSK |
| 10 | -3 | 64517 | GSK |
| 10 | -17 | 64822 | GSK |
| 10 | -17 | 64822 | GSK |
| 10 | -17 | 64822 | GSK |
| 108 | +23 | 65153 | VLO |

Window header: vatedElectronicEyeOnSpeedBump) #17.135 of 08/11/2004(05/02/20...

| OrderFlow | OrderBook | TradeLog | Account | |
|---|---|---|---|---|
| OFT | OFT | Furman 1 | Furman 1 | 05/04/05 |
| 0 | 0 | 0 | 0 | 12:34:00 |

'SEM' 'SYU'!!!

⊠ Crossed  Locked  1 Away

120 →

FROM FIG. 8A          TO FIG. 8D

| | | | | | | | |
|---|---|---|---|---|---|---|---|
| 12:41:40 | VLO | Sep05 | 47½ | Put | 147 | 1.00 | 1.05 | -9 | 1.05 |
| 12:41:40 | VLO | Sep05 | 47½ | Put | 147 | 1.00 | 1.05 | -9 | 1.05 |
| 12:41:40 | VLO | Sep05 | 47½ | Put | 147 | 1.00 | 1.05 | -9 | 1.05 |
| 12:41:40 | VLO | Sep05 | 47½ | Put | 147 | 1.00 | 1.05 | -9 | 1.05 |
| 12:31:01 | GSK | Nov05 | 45 | Put | 70 | 0.90 | 0.90 | -17 | 0.95 |
| 12:31:01 | GSK | Nov05 | 45 | Put | 70 | 0.90 | 0.90 | -17 | 0.95 |
| 12:31:01 | GSK | Nov05 | 45 | Put | 70 | 0.90 | 0.90 | -17 | 0.95 |
| 12:31:01 | GSK | Nov05 | 45 | Put | 66 | 0.90 | 0.90 | -17 | 0.95 |
| 12:27:01 | GSK | Nov05 | 42½ | Put | 89 | 0.55 | 0.54 | -11 | 0.60 |
| 12:27:01 | GSK | Nov05 | 42½ | Put | 118 | 0.55 | 0.54 | -11 | 0.60 |
| 12:27:01 | GSK | Nov05 | 42½ | Put | 193 | 0.55 | 0.54 | -11 | 0.60 |
| 12:27:01 | GSK | Nov05 | 42½ | Put | 70 | 0.55 | 0.54 | -11 | 0.60 |
| 12:27:01 | GSK | Nov05 | 42½ | Put | 70 | 0.55 | 0.54 | -11 | 0.60 |
| 12:27:01 | GSK | Nov05 | 42½ | Put | 41 | 0.55 | 0.54 | -11 | 0.60 |
| 12:40:44 | GSK | Aug05 | 55 | Call | 20 | 0.65 | 0.75 | +25 | 0.70 |
| 12:26:12 | GSK | Aug05 | 45 | Put | 10 | 0.45 | 0.45 | -12 | 0.50 |
| 12:26:12 | GSK | Aug05 | 45 | Put | 10 | 0.45 | 0.45 | -12 | 0.50 |
| 12:26:12 | GSK | Aug05 | 45 | Put | 151 | 0.45 | 0.45 | -12 | 0.50 |

CrossedAndLocked

☐ △ Exchange Sort Feed ClickTrade Prefs 🔍 05/21/2005 ▶

| UNTD | 7 | 11.94 | 20 | 11.95 | 11.95 | 3.09 | 220469 | 11.95 |
|---|---|---|---|---|---|---|---|---|
| | CGamma | PPrem/Par | Vol Revrsl | CPrem/Par | Date | Strk | CBid | CTheo | CA |
| GBBK | GSK | HIBB | KOSP | LBTYA | LNY | MPS | NARAE | NLC | NRG | NTRS | NTY | PBY | PCG |

FROM FIG. 8A

FROM FIG. 8B

| | | |
|---|---|---|
| 10 | -9 | 65145 VLO |
| 20 | -9 | 65145 VLO |
| 10 | -9 | 65145 VLO |
| 110 | -9 | 65145 VLO |
| 10 | -17 | 64822 GSK |
| 10 | -17 | 64822 GSK |
| 10 | -17 | 64822 GSK |
| 10 | -17 | 64822 GSK |
| 10 | -11 | 64821 GSK |
| 10 | -11 | 64821 GSK |
| 10 | -11 | 64821 GSK |
| 10 | -11 | 64821 GSK |
| 10 | -11 | 64821 GSK |
| 10 | +25 | 64240 GSK |
| 35 | -12 | 64237 GSK |
| 35 | -12 | 64237 GSK |
| 35 | -12 | 64237 GSK |

| sk | CTSpd | CDlt | CPos | PDlt | PPos | ChVol | PBid | PAsk | PTheo | PTSpd | CVolu |
|---|---|---|---|---|---|---|---|---|---|---|---|
| | 86 | | -273 | | -2347 | 2445 | | 8.86 | 8.86 | 8.86 | |
| PCO | PLCE | RDA | SEM | SHFL | SVF | SVU | UCOMA | UNTD | VLO | WCI | WCN | ZQ |

FROM FIG. 8C

TO FIG. 9B

User = "Furman_1" #8 Started 05/04/2005 @ 06:55:06 : "!!! Version=Assumption(Deacti Trading Position Monitoring Windows Rt ▲ | S⇵ O⇵ V⇵ Q⇵ | P⇵ ☺ | User Furman 1

IDLE SECURITIES:

| Products | Expirations | Exchanges | | | | | | | |
|---|---|---|---|---|---|---|---|---|---|
| Time | ASCA | e | Strike | Type | bid | Bid | Theo | Dlt | Ask |
| 09:31: | ✓ CHS | 06 | 17½ | Put | 25 | 0.05 | 0.02 | -0 | 0.10 |
| 12:32:0 | ✓ EIX | 07 | 40 | Put | 10 | 1.55 | 1.26 | -14 | 1.60 |
| 12:32:0 | ✓ GBBK | 07 | 40 | Put | 20 | 1.55 | 1.26 | -14 | 1.60 |
| 12:40:4 | ✓ GSK | 07 | 35 | Put | 10 | 0.85 | 0.65 | -7 | 0.90 |
| 12:40:4 | ✓ KOSP | 07 | 35 | Put | 20 | 0.85 | 0.65 | -7 | 0.90 |
| 12:41:2 | ✓ LNY | 06 | 35 | Put | 75 | 0.20 | 0.18 | -3 | 0.25 |
| 12:41:2 | ✓ NRG | 06 | 35 | Put | 75 | 0.20 | 0.18 | -3 | 0.25 |
| 12:41:2 | ✓ NTRS | 06 | 35 | Put | 90 | 0.20 | 0.18 | -3 | 0.25 |
| 12:41:2 | ✓ NTY | 05 | 45 | Put | 41 | | | | |
| 12:31:0 | ✓ PBY | 05 | 45 | Put | 119 | 0.90 | 0.90 | -17 | 0.95 |
| 12:31:0 | ✓ PCG | 05 | 45 | Put | 119 | 0.90 | 0.90 | -17 | 0.95 |
| 12:31:0 | ✓ PCO | 05 | 45 | Put | 186 | 0.90 | 0.90 | -17 | 0.95 |
| 12:31:0 | ✓ PLCE | 05 | 45 | Put | 70 | 0.90 | 0.90 | -17 | 0.95 |
| 12:31:0 | ✓ SHFL | 05 | 45 | Put | 70 | 0.90 | 0.90 | -17 | 0.95 |
| 12:31:0 | | 05 | 45 | Put | 66 | 0.90 | 0.90 | -17 | 0.95 |
| 12:27:0 | | 05 | 42½ | Put | 89 | 0.55 | 0.54 | -11 | 0.60 |
| 12:27:0 | | 05 | 42½ | Put | 118 | 0.55 | 0.54 | -11 | 0.60 |
| 12:27:0 | | 05 | 42½ | Put | 193 | 0.55 | 0.54 | -11 | 0.60 |

| OrderFlow | OrderBook | TradeLog | Account | | |
|---|---|---|---|---|---|
| OFT | OFT | Furman 1 | Furman 1 | | 05/04/05 12:34:00 |
| | 0 | 0 | 0 | | |

'SEM' 'SYU'!!!!

[✕ Crossed] [Locked] [1 Away]

| ask | Dlt | Id | Name |
|---|---|---|---|
| 10 | -0 | 43802 | EIX |
| 10 | -14 | 63200 | GSK |
| 10 | -14 | 63200 | GSK |
| 10 | -7 | 64518 | GSK |
| 10 | -7 | 64518 | GSK |
| 10 | -3 | 64517 | GSK |
| 10 | -3 | 64517 | GSK |
| 10 | -3 | 64517 | GSK |
| 10 | -3 | 64517 | GSK |
| 10 | -17 | 64822 | GSK |
| 10 | -17 | 64822 | GSK |
| 10 | -17 | 64822 | GSK |
| 10 | -17 | 64822 | GSK |
| 10 | -17 | 64822 | GSK |
| 10 | -17 | 64822 | GSK |
| 10 | -11 | 64821 | GSK |
| 10 | -11 | 64821 | GSK |
| 10 | -11 | 64821 | GSK |

120

FROM FIG. 9A

| | | | | | | |
|---|---|---|---|---|---|---|
| 12:27:00 ✓ | SVF | 05 | 42½ | Put | 70 | 0.55 | 0.54 | −11 | 0.60 |
| 12:27:00 ✓ | SVU | 05 | 42½ | Put | 70 | 0.55 | 0.54 | −11 | 0.60 |
| 12:27:00 | | 05 | 42½ | Put | 70 | 0.55 | 0.54 | −11 | 0.60 |
| 12:42:40 ✓ | UNTD | 05 | 42½ | Put | 41 | 0.55 | 0.54 | −11 | 0.60 |
| 12:43:23 ✓ | VLO | 05 | 55 | Call | 10 | 0.65 | 0.75 | +25 | 0.70 |
| 12:43:23 ✓ | | 05 | 45 | Put | 10 | 0.45 | 0.45 | −12 | 0.50 |
| 12:43:23 ✓ | WCI | 05 | 45 | Put | 10 | 0.45 | 0.45 | −12 | 0.50 |
| 12:43:23 ✓ | ZQK | 05 | 45 | Put | 151 | 0.45 | 0.45 | −12 | 0.50 |
| 12:43:23 | GSK | Aug05 | 45 | Put | 20 | 0.45 | 0.45 | −12 | 0.50 |
| 12:43:23 | GSK | Aug05 | 45 | Put | 20 | 0.45 | 0.45 | −12 | 0.50 |
| 12:43:23 | GSK | Aug05 | 45 | Put | 20 | 0.45 | 0.45 | −12 | 0.50 |
| 12:40:43 | GSK | Aug05 | 42½ | Put | 90 | 0.20 | 0.23 | −6 | 0.25 |
| 12:40:43 | GSK | Aug05 | 42½ | Put | 122 | 0.20 | 0.23 | −6 | 0.25 |
| 12:40:43 | GSK | Aug05 | 42½ | Put | 260 | 0.20 | 0.23 | −6 | 0.25 |
| 12:40:43 | GSK | Aug05 | 42½ | Put | 75 | 0.20 | 0.23 | −6 | 0.25 |
| 12:40:43 | GSK | Aug05 | 42½ | Put | 75 | 0.20 | 0.23 | −6 | 0.25 |
| 12:40:43 | GSK | Aug05 | 42½ | Put | 41 | 0.20 | 0.23 | −6 | 0.25 |
| 12:35:39 | GSK | Aug05 | 40 | Put | 75 | 0.10 | 0.12 | −3 | 0.15 |

CrossedAndLocked

△ Exchange Sort Feed ClickTrade Prefs 🔍 05/21/2005 ▶

| UNTD | 29 | 11.89 | 29 | 11.90 | 11.90 | 3.04 | 220469 | 11.90 |
|---|---|---|---|---|---|---|---|---|
| CGamma | PPrem/Par | Vol | Revrsl | CPrem/Par | Date | Strk | CBid | CTheo | CA |
| GBBK | GSK | HIBB | KOSP | LBTYA | LNY | MPS | NARAE | NLC | NRG | NTRS | NTY | PBY | PCG |

| | | | |
|---|---|---|---|
| 10 | -11 | 64821 | GSK |
| 10 | -11 | 64821 | GSK |
| 10 | -11 | 64821 | GSK |
| 10 | -11 | 64821 | GSK |
| 10 | +25 | 64240 | GSK |
| 35 | -12 | 64237 | GSK |
| 35 | -12 | 64237 | GSK |
| 35 | -12 | 64237 | GSK |
| 10 | -12 | 64237 | GSK |
| 10 | -12 | 64237 | GSK |
| 60 | -12 | 64237 | GSK |
| 35 | -12 | 64237 | GSK |
| 10 | -6 | 64236 | GSK |
| 10 | -6 | 64236 | GSK |
| 10 | -6 | 64236 | GSK |
| 10 | -6 | 64236 | GSK |
| 10 | -6 | 64236 | GSK |
| 10 | -6 | 64236 | GSK |
| 10 | -3 | 64235 | GSK |

| | 96 | -273 | -2347 | 2445 | 8.86 | 8.86 |
|---|---|---|---|---|---|---|
| sk | CTSpd | CDlt | CPos | PDlt | PPos | ChVol | PBid | PAsk | PTheo | PTSpd | CVolu |

| PCO | PLCE | RDA | SEM | SHFL | SVF | SVU | UCOMA | UNTD | VLO | WCI | WCN | Zq |

FROM FIG. 9B

FROM FIG. 9C

METHOD AND APPARATUS FOR DISPLAY OF DATA WITH RESPECT TO CERTAIN TRADABLE INTERESTS

CROSS-REFERENCE TO RELATED APPLICATIONS

This application claims the benefit of U.S. Provisional Patent Application Ser. No. 60/678,016, filed May 5, 2005, and also claims the benefit of U.S. Provisional Patent Application Ser. No. 60/700,677, filed Jul. 19, 2005, which are both incorporated herein by reference.

BACKGROUND OF THE INVENTION

1. Field of the Invention

The present invention relates generally to a method and apparatus for computer display of information relating to certain tradable interests and, in particular, to a method and apparatus for display of information with respect to investment instruments, such as options or the like, traded on an exchange.

2. Description of the Related Art

Most people are familiar with stocks as a share of a company and know that stocks are traded on an exchange. Stocks are also known as equities, where equities are generally classified as "listed"; implying that they trade in a regulated exchange environment (like the New York Stock Exchange or Philadelphia Stock Exchange), or "OTC" (over the counter) which implies that they trade over-the-counter (between NASD member firms in a less regulated dealer-to-dealer network). Listed stock symbols are made up of three or fewer letters (i.e. TYC) whereas OTC stocks have at least four letters (i.e. MSFT). Regional exchanges in recent years have begun to list OTC stocks as their volumes have increased. Typically, listed stocks are viewed as more liquid since they are serviced by a Specialist in an exchange environment who is responsible for providing a fair and orderly market at all times. However, the proliferation of electronic communications networks (ECNs) has narrowed the distinction between listed and OTC stocks.

In addition to equities, debt instruments, such as bonds, are another type of investment instrument or security. Trading is also conducted in options and futures. The term "option" is short for option contract, which is a securities contract which conveys to its owner the right, but not the obligation, to buy or sell a specific amount of a particular stock, commodity, currency, index, or debt, at a specified price on or before a given date. An option to buy is referred to as a call option, or simply a call, and an option to sell is referred to as a put option, or simply a put. The price specified in the option contract is referred to formally as the exercise price, and informally as the strike price. For stock options, the amount of an option contract is usually 100 shares.

Each option has a buyer, called the holder, and a seller, known as the writer. If a call stock option contract is exercised by the holder, a writer is responsible for fulfilling the terms of the contract by delivering the shares to the holder. In the case of an option that does not have an underlying interest that can be delivered, such as an index, the contract is settled in cash.

Options are most frequently used as either leverage or protection. As leverage, call stock options allow the holder to control equity in a limited capacity for a fraction of what the shares would cost. The difference can be invested elsewhere until the option is exercised. There are listed options on thousands of stocks, some of which are more heavily traded than others. Dealers make markets in many options at a time. The more options managed, the more the dealer grows his or her business.

The term "futures" are short for futures contract, which is an agreement to make or take delivery of a commodity, bond, security or stock index at a specified future time and price. Futures contracts are traded on individual U.S. equities.

Many variations on options and futures have been developed. Equities, commodities, options, and futures, as well as other securities and investments and the like are included in the term tradable interests.

A liquidity provider is a person who buys and sells tradable interests, often for the person's own personal account rather than on behalf of a client. A liquidity provider may buy and hold these interests for a short period of time with the goal being to profit from short term gains in the market. A liquidity provider may be an options exchange member who makes bids and offers for his or her own account. A liquidity provider may in some instances be referred to as a trader, a market maker, or a local dealer.

Trading is conducted by a liquidity provider by placing bids and/or offers, where a bid or bid price is the highest price that a liquidity provider is willing to pay for a given tradable interest at a given time. An offer or ask price is the lowest price that a liquidity provider will sell a tradable interest for.

In order for there to be a market for a tradable interest, there needs to be a person to buy and a person to sell. Markets are enhanced by people willing to step in and buy when there is no natural buyer or sell when there is no natural seller. People that do this in an exchange or exchange-like environment are often referred to as market makers, and are also considered liquidity providers. The prices at which they are willing to transact are called quotes.

A quote is a price and size at which the liquidity provider is willing to initiate a trade. The price and size at which the liquidity provider is willing to buy is the bid and bid size and the price and size at which the liquidity provider is willing to sell is the ask or offer and ask size or offer size. Ask and offer refer to the same thing. The difference between the bid price and the ask price is the bid/ask spread, also referred to simply as the spread.

For the market maker-type liquidity providers, the objective is to engage in as many transactions as possible at the liquidity provider's price to capture the spread. To be able to participate in a large number of transactions, the liquidity provider must monitor large amounts of data from the exchange or exchange-like environment. Liquidity providers will often monitor or participate in trading on thousands of tradable interests at the same time. The information being monitored is received from one or more exchanges and represents the quotes of many liquidity providers and transactions that have taken place. For active tradable instruments the information can change rapidly. The trading information is displayed on display screens, such as computer screens or the like. It is not uncommon for a market maker-type liquidity provider to have six or eight computer screens in front of them to display the exchange data. Even with this number of screens, a liquidity provider may be able to view a small fraction of the activity in his or her portfolio. There exists a need to filter and condense this quantity of information to fewer screens so that the liquidity provider is able to view and use the information.

Liquidity providers who disseminate and/or monitor option quotes on many stocks simultaneously have a difficult time monitoring prices for more than a small number (or maybe even from one) of those option classes at any one time since each stock has one or more pages of options quotes and the liquidity providers typically have a limited amount of screen space. Even if the liquidity provider is able to monitor many screens simultaneously, it is extremely difficult to quantify which quotes present the best trading opportunities Trading organizations that evaluate real-time market data are forced to process a mammoth amount of quote information. One can only view a page of information at one time and users are limited in terms of the number of screens that are available to monitor the market information that applies to the portfolio of tradable interests with which they have a trading interest. Only a small portion of all option quote information relates to a single portfolio and only a small portion of those quotes are relevant to a liquidity provider. Further, based on the speed in which quotes change, the information may only be relevant for fractions of a second.

Liquidity providers are able to observe trades reported to market data vendors in a simplistic fashion now that provides very little information beyond the price, quantity, time and exchange origin of a transaction. This information is marginally valuable in its raw form.

SUMMARY OF THE INVENTION

The present invention provides a computer program for generating a display of information and a method for display of the information for an trading system. The computer program and method includes capabilities to mine information from the information received from exchanges to provide the liquidity provider with optimum trading opportunities. Another aspect of the invention provides a timely display of relevant information for a liquidity provider. A further aspect of the invention provides a display that presents the information from an electronic exchange in a form optimized for use by a liquidity provider.

In one embodiment, the computer program and method displays information presented to provide trade opportunities for the liquidity provider where there has not yet been a trade. This information is presented in several windows or displays referred to as quote aggregation windows. In one of the windows of this embodiment, the display includes an out-of-line display or window to show a difference between the liquidity provider's valuation assumptions and the prevailing marketplace, which may include multiple price sources. In another window of this embodiment, a display is provided that shows information on quotes where the quotes are locked (the bid equals the offer) among two or more marketplaces, where the bids and offers are crossed (the bid is higher than the offer) among two or more marketplaces, and where the bid is one tick (one trading increment) away from the offer in either direction among two or more marketplaces. In yet another of the windows of this embodiment, the trading information is displayed for an inverted market, where anyone's bid (either the user or a third party bid) is higher than anyone's offer on any exchange. A liquidity provider using one or more of these windows or displays is better able to understand the trading opportunities available and to capitalizes on them.

BRIEF DESCRIPTION OF THE DRAWINGS

FIG. 4 is a screen shot of a computer display of an out of line window of the quote aggregation displays;

FIG. 6 is a screen shot of a computer display of a crossed and locked window of the quote aggregation displays;

FIG. 8 is a screen shot of a computer display of the crossed and locked window showing filtering by expiration month;

FIG. 9 is a screen shot of a computer display of the crossed and locked window showing selecting and deselecting by portfolio;

FIG. 11 is a screen shot of a computer display of the inverted window filtered by product security;

FIG. 12 is a screen shot of a computer display of the inverted window filtered by expiration date;

FIG. 14 is a screen shot of a computer display of the inverted window where an entry has been selected for order execution and the order entry window is displayed.

DETAILED DESCRIPTION OF THE PREFERRED EMBODIMENTS

Figure 1:
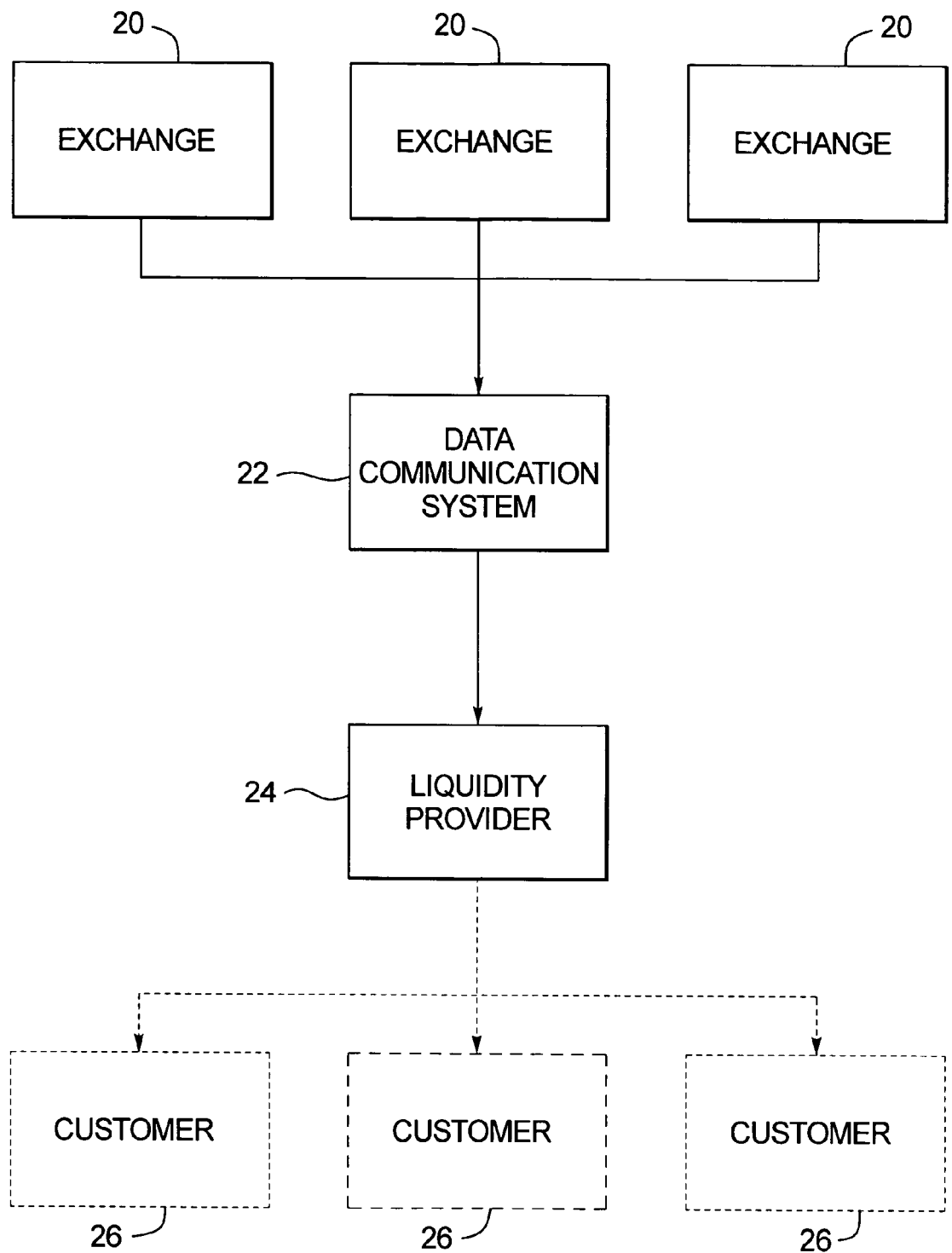
FIG. 1 is a functional block diagram showing communications between a liquidity provider and exchanges.

With reference to FIG. 1, a number of exchanges 20 are available on which are traded tradable interests. An exchange is an organization, association or group which provides or maintains a marketplace where securities, options, futures, or commodities can be traded. The exchanges 20 may be electronic exchanges or open outcry exchanges, or may use some other trading system. The information from the exchanges 20 is connected to one or more data communication systems 22, such as networks, telecommunications systems, and other communications systems. The data communications systems transmit the data provided by the exchanges 20 for distribution to liquidity providers 24. The data communications systems may include a single data transfer path or multiple data transfer paths or multiple systems that provide for the two way transmission of the data between the exchange and the liquidity provider 24. The data communications systems 22 are preferably secure transmission systems that prevent interception or tampering with the data. For a liquidity provider located near to one particular exchange 20 and farther from other exchanges, the data communication system may include two parts, one part connected to the local exchange 20 and the other part connected to the more remote exchanges. It is also possible that a separate connection may be provided between the liquidity provider 24 and each of the exchanges 20 or that any combination of data communications with the exchanges 20 may be provided.

The data from the exchanges 20 is utilized by the liquidity provider 24 for monitoring the market and for making trades. The trades may be made by the liquidity provider 24 for customers 26 or for the liquidity provider's own account. For instance, the liquidity provider 24 may have several customers 26 for which the liquidity provider is making trades, monitoring the market, etc.

Figure 2:
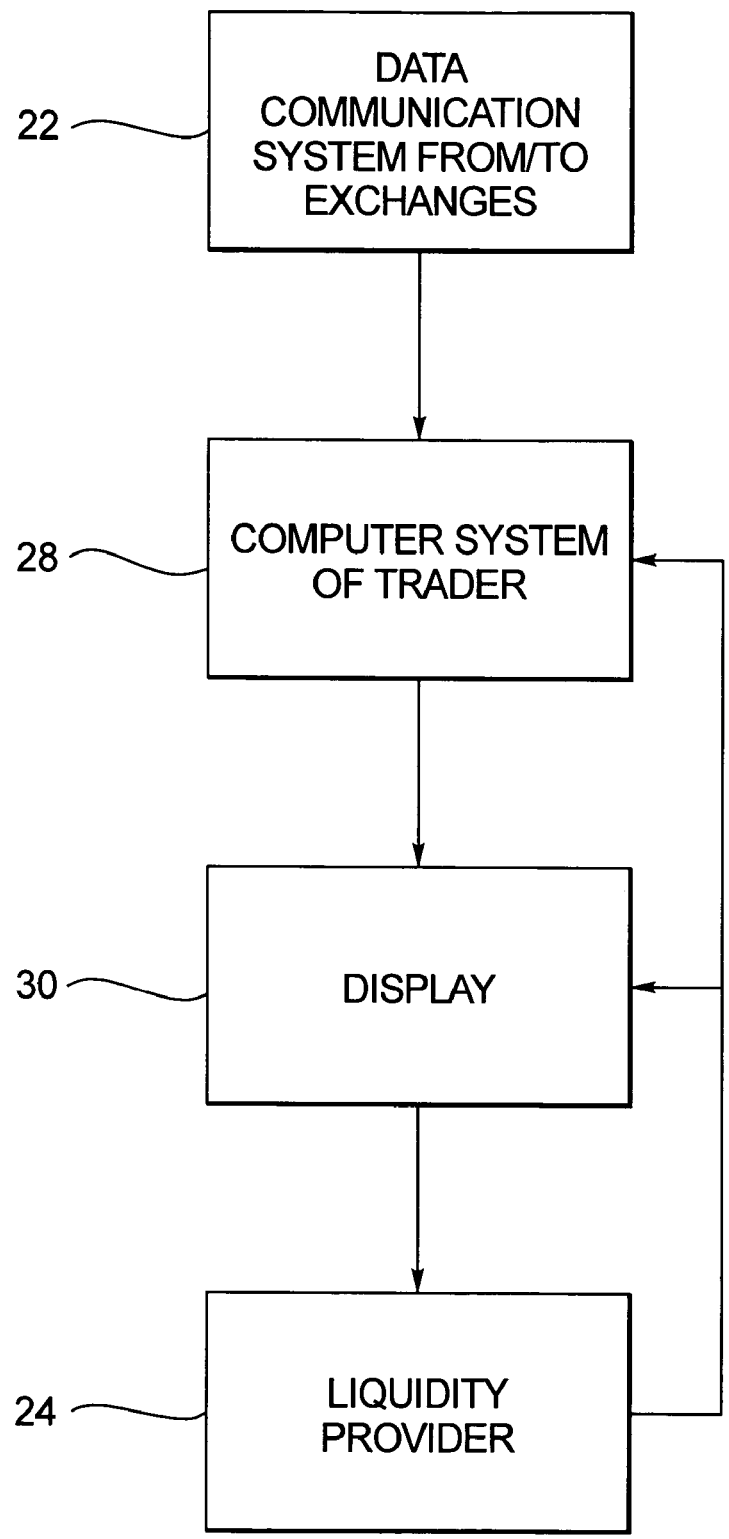
FIG. 2 is a functional block diagram showing a liquidity provider and the liquidity provider's computer system.

The exchanges 20 generate significant amounts of data. For instance, current message volume on the major exchanges can result in 200,000 messages per second. The liquidity provider 24 who wishes to utilize the data effectively must have a system to work through the volume of data. In FIG. 2, the data from the exchanges 20 is provided to a computer system 28 of the liquidity provider 24. The computer system 28 has a display 30 and has software to assist the liquidity provider 24 in viewing, according to the present invention, only relevant data condensed to one or a few screens. Many liquidity providers utilize more than one display screen to show the trading data. For instance, the liquidity provider 24 may choose to utilize two, three, four, six or even eight screens to show various aspects of the data and other information that the liquidity provider considers as important for trading. The display 30 may therefore refer to a single display screen or to multiple screens. The preferred embodiment of this invention enables the liquidity provider to use fewer screens. More importantly, the present display brings information to the user's attention that the user would most likely not see in a timely enough manner to be useful. The computer system 28 may be a stand alone computer or may include a network of connected user computers, server computers and other associated network devices. If the liquidity provider 24 works with a trading firm, the trading firm most likely has a network with the connection to receive the exchange data and provide it to the computer of the liquidity provider 24.

The present system deals with information from different sources, most commonly from exchanges or alternative trading systems. A source of the information is from electronic exchanges or other industry sources. SIAC (Securities Industries Automation Corporation) market data is one such source. Another source might be a market data vendor. Another source of information presented to the liquidity provider is information such as quotes generated in the present system or generated in the computer system of the liquidity provider.

Out-Of-Line Window

Although the liquidity provider 24 may utilize a variety of different software programs to view the data, the present description is directed to methods, software and systems according to the principles of the present invention. The exchange data according to a preferred embodiment is displayed to the liquidity provider 24 using the display screen 30 of the liquidity provider's computer system 28 to display a window referred to here as an out-of-line window, also referred to here as out of line window. The out of line window may occupy one portion of a display screen 30 or may occupy one entire screen, particularly where several screens are being utilized by the liquidity provider 24. It is even foreseeable that a liquidity provider 24 may chose to display the out of line window on several display screens 30. The out of line window described in the following may be provided as part of a suite of programs to assist the liquidity provider in trading.

Figure 3:
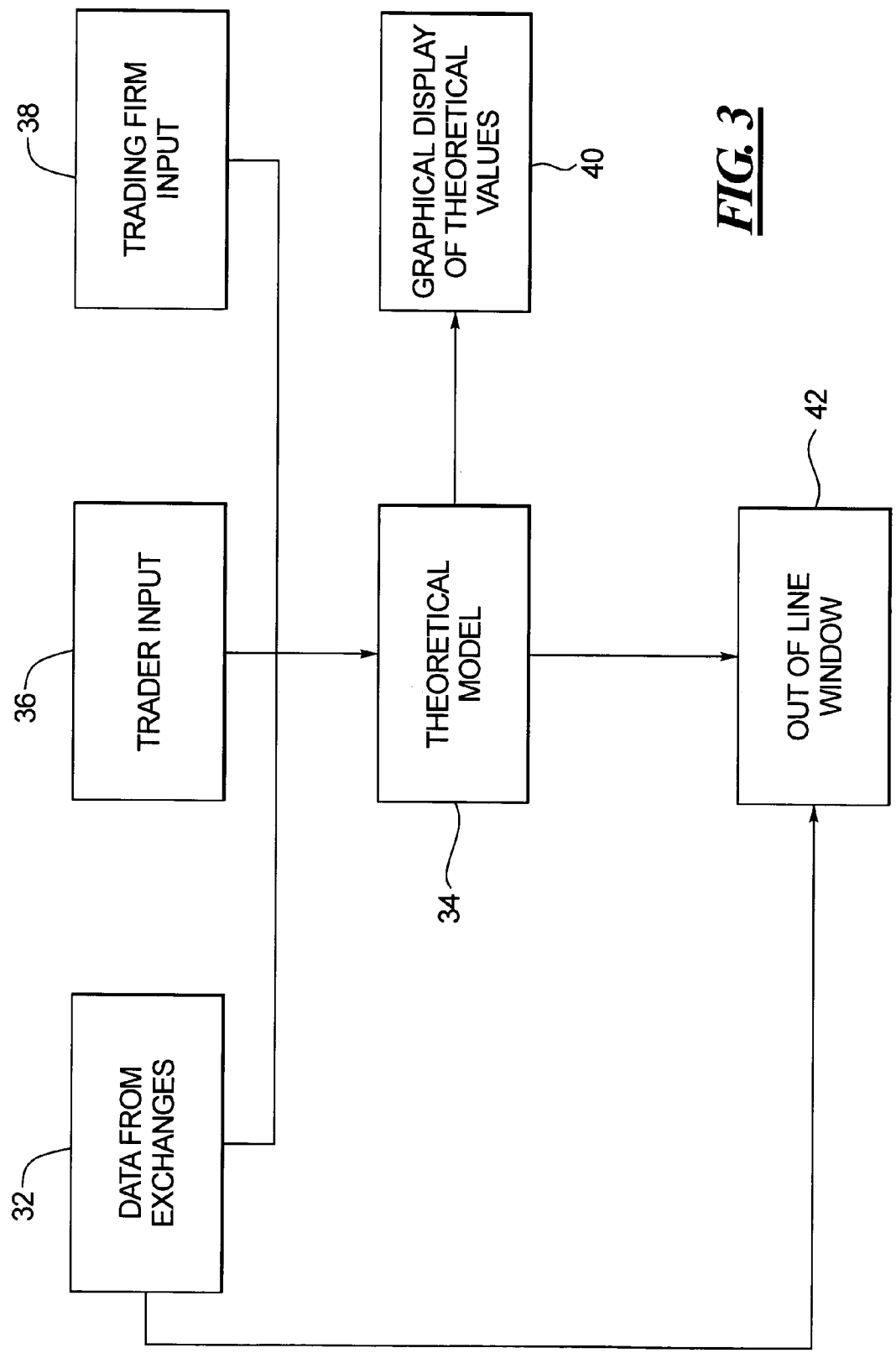
FIG. 3 is a functional block diagram showing development and utilization of a theoretical model in an out of line window.

The out of line window provides a comparison of theoretical values for a tradable interest to the actual values received from the exchanges 20. A theoretical value is generated from various inputs and is an effort to forecast the future value of the tradable interest. In one example, the theoretical value is obtained from a theoretical model 34 generated, as shown in FIG. 3, through the use of data 32 from the exchanges, that may include historical data, for the tradable interest. The theoretical model 34 is also derived with input 36 from the liquidity provider, and potentially input 38 from a trading firm, such as where the liquidity provider 24 is associated with a trading firm. The values of the theoretical model 34 for the tradable interest may be displayed 40 for the liquidity provider 34 in what is referred to as a volatility curve. This curve typically has a shape similar to a smile shape, denoting the increased volatility of the tradable interest farther from the known values of the present trades. It is of course possible to display the theoretical model 34 numerically or in some other way as well. The theoretical model 34 is compared to data 32 from the exchanges to generate the out of line window 42. A theoretical value 34 is generated for each tradable interest being considered by the liquidity provider.

The out of line window 42 is shown in FIG. 4, loaded with data from options on an underlying security. The displayed data in the out of line window is dynamic, being constantly updated with comparisons of the liquidity provider's theoretical value of an option, versus the national best bid and offer disseminated from national or electronic exchanges. The out of line display allows the user, or liquidity provider 24, to quickly perform the following tasks:

Enter an option order to capture theoretical edge to the user's value;

Take advantage of arbitrage opportunities in a large number of securities;

Become aware of any discrepancies in the marketplace versus the user's theoretical values; and Monitor volatility discrepancies in securities that are not overly active but necessary for portfolio management.

In the display of the out of line window 42, data is presented in rows and columns provided with labels referring to terms that liquidity providers commonly use in referring to trading situations and factors. These terms include the following, which are well understood by traders and other liquidity providers in this field: strike, which is short for strike price: delta, which refers to the change in price of a call option for every one-point move in the price of the underlying security (also called hedge ratio); vega, which refers to a change in the price of an option that results from a 1% change in volatility; calendar spread, which refers to the simultaneous purchase and sale of options of the same class and strike price but different expiration dates; gamma, which refers to a measurement of how fast delta changes given a unit change in the underlying futures price; theta, which is the ratio of the change in an option's price to the decrease in its time to expiration (also called time decay); and rho, which is the dollar change in a given option's price that results from a 1% change in interest rates.

The purpose of this window 42, as well as the other windows described herein, which are collectively referred to as quote aggregation windows, is to identify information known by the computer application that is not readily apparent to the liquidity provider due to the information otherwise being physically impossible to view and practically too expensive and inefficient to display. The quote aggregation windows seek to gather only relevant information from the program and to display the information in condensed fashion for the user. The user may thereby pay attention to only one screen instead of scanning hundreds of screens or more likely miss the information altogether.

An important feature of each of the windows of this example is that the displayed information is sorted and/or filtered by pricing data. In one example, the pricing data is bid price, offer price and theoretical price. The pricing data is the primary factor that determines what is displayed and what is not displayed on the display. For many liquidity providers, the pricing data is the only data that matters. In the preferred embodiment, the exchange identity is indicated by the color of the pricing data being displayed. According to this presentation, the originating exchange data is therefore also primary data on which to sort and/or filter since it is built into the pricing data. It is contemplated to de-couple the exchange data from the pricing data so that this is not the case in some applications.

Supporting data, such as quantity of a bid or ask, may be considered in addition to the pricing data by the liquidity provider in determining whether to submit a quote or how much of a quote to submit. For example, if one quote at a small quantity differs from other quotes at higher quantities, the entity submitting the small quantity quote may not be as aware of market conditions, for example, as the submitters of the larger quantity quotes. As such, knowing the quantity in addition to the pricing data would help the liquidity provider determine whether to submit a quote based on the pricing data of a particular bid or ask. Each trader or other liquidity provider has their own set of supporting data that they consider before submitting a quote. The user of the present system may change the data displayed on the screen to agree with their preferred set of supporting data. For example, a user may chose to hide a particular item of data from being displayed.

It is envisioned to provide a display according to this window and the others discussed herein where the supporting data becomes the primary data on which to filter. For example, the user may choose to sort by some other criteria than generating the most profit.

An example of the out of line window 42 showing the pricing data and a typical set of secondary data is shown in FIG. 4. The screen showing the out-of-line window 42 has columns labeled with the following terms: Name—the name of the recognized trading symbol of security, reference 44; Date—the month and year of the expiration date of the expiring option, reference 46; Strk—the strike price of the option, reference 48; Type—whether it is a put or call option, reference 50 (the puts are on differently colored backgrounds than the calls, red and blue in the example); bid—the number of contracts on the bid price on the exchange (the exchange designations are also color-coded), reference 52; Bid—the national best bid disseminated on the option market, reference 54; Theo—the theoretical value of the option based upon the average of the bid and offer, reference 56; Ask—the national best offer of disseminated on the option market, reference 58; ask—the number of contracts on the ask price on exchange (the exchange designations are also color-coded here), reference 60; Dlt—the delta of the option that is selected as "Out of Line", reference 62; Vega—the vega function of the option that is selected as "Out of Line", reference 64; Price—the user's theoretical value of the option based upon the bid of the underlying security, reference 66; TSpd—the theoretical value of the one term "calendar spread", reference 68; Volu—the composite total volume of all option activity, reference 70; Gamma—the gamma function of the option noted "Out of Line", reference 72; Theta—the theta decay function amount for such option, reference 74; Rho—the sensitivity to interest rate movement for selected option, reference 76; Last—the last price option traded, reference 78; Pos—the net "inventory" positions for this security where Pos equals (call)+(put), reference 80; and OffV—the differential between the theoretical value and the actual value, reference 82. The OffV number is the value used to sort the listing, in at least one display mode. In another embodiment, the display may also indicate for the selected option, the previous month, same strike price.

The liquidity provider 24 using the present display 42 is able to determine from the displayed data which theoretical values 56 of the theoretical model are out of line with the actual market values appearing on the exchanges. When the theoretical values 56 and actual values of the trades are out of line, they are displayed at the top of the listing in the display screen 42. The greater the values are out of line with one another, the higher they are on the listing. Using the out of line window 42, the liquidity provider 24 can determine when the user's theoretical value is crossed with a bid or an offer in the marketplace.

The liquidity provider 24 utilizes this sorted listing to identify potential trade opportunities. The better trade opportunities are shown at the top of the list in the out of line window 42 when sorted by the Off V column 82. Another use for the listing of the out of line window 42 is that the liquidity provider may determine that the theoretical values 56 are out of line with the market value of the tradable interest and therefore the theoretical assumptions need to be reviewed and possibly updated. The liquidity provider 24 may then change the theoretical values, either by direct manipulation of the graphical representation of the theoretical values or by changing input values supplied to the theoretical model. After making a change in the theoretical calculation, the liquidity provider 24 may again look to the out of line window 42 to determine if the errors in the theoretical values have been corrected, and what market values are out of line.

The theoretical values may be determined using the another software program that is either separate from the present software, incorporated into the present program, or a component of a suite of programs. Software for calculating theoretical values of tradable interests is well known and not discussed in detail here.

Another instance when the market values and theoretical values 56 are out of line with one another is that the market data is in error or contains anomalies. This may happen as the result of erroneous data entry or for some other cause. Values that the liquidity provider considers erroneous or otherwise unhelpful can be disregarded or can be hidden from being displayed by a command of the present software from the liquidity provider. For example, a perceived erroneous value is selected by the liquidity provider and a command, such as a right click with a mouse or other pointing device, is implemented to call up a menu that includes a command to hide the selected value.

The list can also be used as a relative measure of the need to change variables used to derive values. For example, if a high percentage of the trading opportunities on the out of line window are transactions that would result in a sale, it is probable that the values of options in the portfolio are too low and require adjustment.

The components of the list are defined as trading opportunities and are sorted in descending order of theoretical profit so that the trading opportunities with the highest theoretical profit are always at the top of the list. Trading opportunities may be filtered to exclude symbols (options that are identified by the symbol on the underlying security) that the user is not interested in trading. The filtering can be performed based on a number of different criteria. In exemplary embodiments, the filtering is performed by expiration months, calls/puts, stock symbols, inventory, delta, or the like. The filtering process itself is a way to "name" root symbols to be excluded. Filtering is accomplished by the user selecting the corresponding filter from the pull down menu 84.

In this way, the most valuable trade data sorted from the thousands of trades in the exchange data stream is brought to the liquidity provider's attention.

Figure 5A:
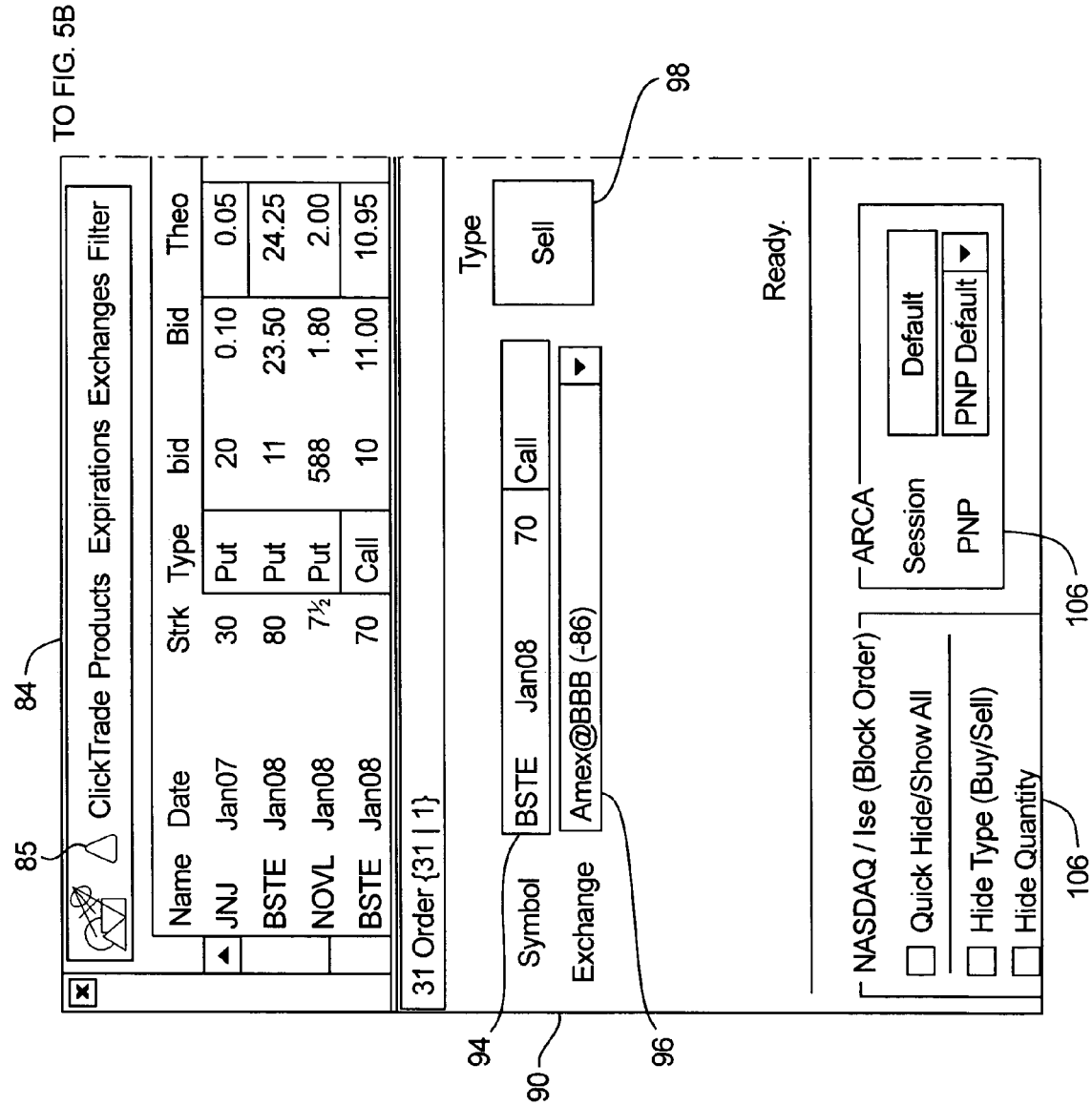
FIG. 5 is a screen shot of a computer display of an order entry window of the out of line window.
Figure 5B:
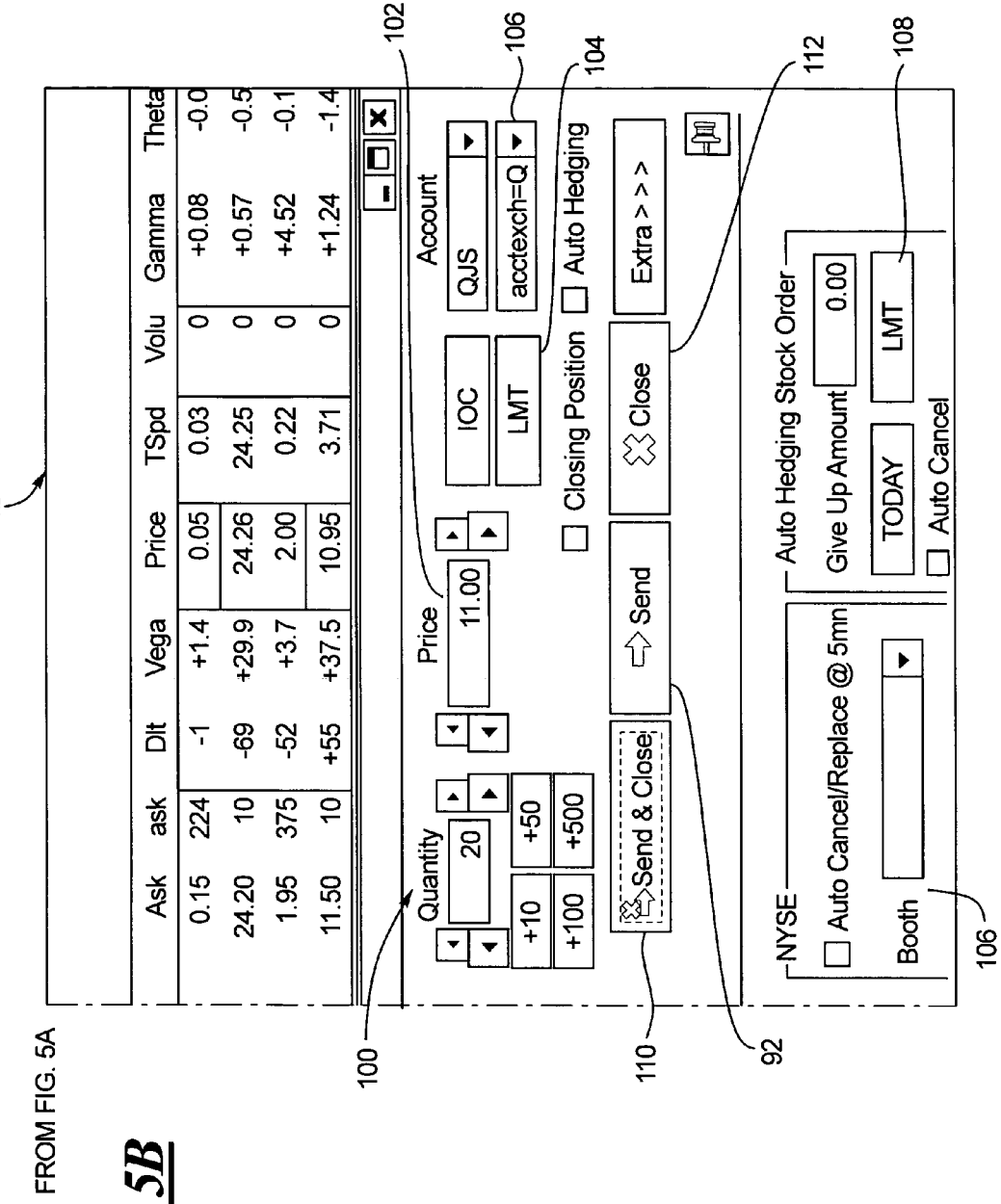

The out of line window of FIG. 4 includes standard windows elements, including a menu bar 84 with pull-down menu items. The menu bar 84 is seen more readily in FIG. 5 and includes menus for clicktrade, products, expirations, exchanges, and filter. As noted above, the user may change the data displayed on the screen. In the out of line window 42 as shown in FIGS. 4 and 5, this is accomplished by selecting a triangle symbol 85, which opens a menu that permits changing of the secondary data that appears on the screen. A fanciful symbol is also present on the menu bar 84 that indicates to the user which of the windows is the user is currently viewing. As will be seen, the other windows have their own distinctive symbol that can be recognized by the user.

In this aspect of the invention, a system and method are provided for aggregating, sorting and displaying specific option market quotes from a portfolio of identified securities where the bid is higher or the offer lower than the theoretical, mid-market or other calculated value, which here is "the value," of the option as derived by the trading system. This is accomplished by the out-of-line window 42. The option market quote that has the greatest differential from the value (this is the theoretical profit) of all options being monitored within the portfolio are displayed at the top of the window followed by the option with the next highest differential. Thus, the pricing data drives the display. The resulting components of the list, which are updated in real-time, are defined as trading opportunities or they are indications that the liquidity provider needs to revise his or her assumptions on which the theoretical values are based. The listed data is sorted in descending order of theoretical profit so that the trading opportunities with the highest theoretical profit are always at the top of the list.

Trading opportunities may be filtered to eliminate from the list items that do not meet an initial screening protocol established by the liquidity provider. Trading opportunities may be acted upon manually or automatically based upon pre-established rules, contingently automatic based upon meeting a future contingent variable, or ignored. The present software in one embodiment has at least one command to eliminate a particular option from the list for a period of time to be specified by the user. The user may select the period for hiding the entry, such as by a pull down menu.

The system and method displays the trading opportunity (including, but not limited to, such information as price, quantity available at the price, exchange disseminating the quote, theoretical profit per contract (adjusted by a multiplier)) and allows the liquidity provider to: a) manually route the order by clicking with the mouse to activate the order screen 90, b) automatically route the order based on pre-describing the criteria that would allow the generation of an automatic order, or c) adjust the user's theoretical input mechanism (either manually or automatically) to account for the observed change in market conditions.

The user may wish to submit an order based on the information displayed on the screen. The orders have various components as will be understood by those in this art. For example, an order generally includes at least a price and quantity as well as an identification of the instrument. The user can place an order directly from the out of line window 42.

As shown in FIG. 5, the out of line window 42 also includes a feature whereby the user can use their mouse or other pointing device to click on a disseminated bid or offer from another exchange and "load" an active order entry window 90. Once the user checks the information in the order entry window 90 for accuracy, the user can click on the SEND command button 92 and submit an order for execution to the desired exchange. In the example below, if the user wanted to sell the $11.00 bid on the AMEX (American Stock and Options Exchange) for 10 contracts of the BSTE (BioSite Incorporated) January 2008 70 calls, using only a mouse, the user or liquidity provider clicks on the $11.00 bid in the display 42 and the order entry window 90 is activated with all the necessary trade and account information automatically populated in the text boxes. The order may then immediately be placed using the order window 90. Clicking on a bid automatically opens and populates the order entry window 90 as a sell order. Conversely, if the user wants to buy an option on a disseminated offer, the user clicks on the offer and the order entry window 90 opens and is automatically populated with the a buy order assumed.

The user is presented with the detail information on the order in the various boxes of the order entry window 90. This information includes, in the illustrated example, the contract information 94 including the symbol, contract date, amount and put or call status, the exchange 96, the type of order (buy or sell) 98, the quantity 100, including a number of preset quantity buttons and value changing buttons, the price 102 including several price changing buttons, 10C (immediate or cancel) and LMT (limit) buttons 104, and account information fields 106. The order entry window 90 also permits the user to select a closing position or auto hedging function. Separate portions of the window are provided for exchange specific information, including NASDAQ, ARCA, and NYSE information 106, as well settings for the auto hedging function 108.

Once the details of the order are examined for accuracy the user or liquidity provider only needs to click on the "Send" button 92, or on the "Send & Close" command button 110 to submit the order. If the user or liquidity provider 24 decides not to submit the order for execution, the close button 112 can be selected and the order window will be disabled and closed without any submission of your order. The user or liquidity provider can also close the window by clicking on the small "x" in the upper right and corner to close the window. Extra features may be displayed by selection of the corresponding command.

The user can predefine order variables that will be included with each order so that the user can send an order on a single click of the mouse or other pointing device without the order window opening. This speeds the order sending process so that brief opportunities are not missed by the delay in setting the values in the order window.

Thus, a system and method is provided by the out of line window for aggregating, sorting, displaying, modifying theoretical inputs and for order routing based upon option market quotes from a portfolio of identified securities where the market data source is disseminating a bid that is higher (or an offer that is lower) than the theoretical value of the option as derived by the trading system. The option market quote that has the greatest differential from the calculated theoretical value (also referred to as theoretical profit) of all options being monitored within the portfolio are displayed at the top of the window followed by the option with the next highest differential. The liquidity provider is therefore provided with relevant, condensed information for trading.

Crossed, Locked, One-Tick Away Window

Another window used by the liquidity provider in the present software is a so-called crossed and locked window 120, as shown in FIG. 6. The crossed and locked window 120 compares data of the liquidity provider's primary exchange with data from other exchanges. The primary exchange is the exchange that the liquidity provider has identified in the software as being the user's primary exchange. The primary exchange may be the user's home exchange, although it need not be. The crossed and locked window 120 identifies option markets where the bid or offer on the primary exchange (as identified by the user) is crossed with (where the bid exceeds the offer), locked with (where the bid equals the offer), or one tick away from (one price increment from locked) another exchange. For example, the crossed bid and offers are displayed by selection of command button 122, the locked bid and offers are displayed by selection of the command button 124, and the one away bid and offers are displayed by selection of the "1 Away" command button 126.

For the crossed and locked window, the focus is on quotes on the primary exchange. For example, the data is displayed with a bid on the primary exchange is higher than an offer on another exchange, or vice versa.

The crossed and locked window 120 displays the best markets from each exchange, which may or may not include the liquidity provider's own quote. The liquidity provider 24 can use a pull down menu bar 128 to select or deselect any expiration month, exchange or security.

Using the crossed and locked window 120, the liquidity provider 24 may quote, or enter trades, on one side or the other, on the liquidity provider's primary exchange. Trade opportunities on the primary exchange become more apparent to the liquidity provider using the crossed and locked window 120. Trades can be made directly from the crossed and locked window 120 by opening an order entry window, as described above with respect to the out of line window 42, or by presetting values to enable one click trading, also as described above. Trading on the primary exchange, which is most commonly the home exchange of the liquidity provider, has the benefit of a shorter transmission time for the trading information, so that trade opportunities are not missed by even slight delays to other exchanges.

As noted above, the primary sort data for the windows is pricing data, such as bid price and ask price, and supplemental data is provided to aid the liquidity provider in making the decision to enter a trade or not. Following is a discussion of one example of a screen displaying pricing data and a typical set of supplemental data. The user may change the displayed data by selection of the triangle symbol. In the preferred embodiment, only the supplemental data may be changed by the user.

The columns shown in the crossed and locked window 120 include the following: Time—which refers to the timestamp of a detected crossed and locked market, reference 130; Name—the name of the option given by the security symbol of the underlying security, reference 132; Date—the expiration month and year of the option detected, reference 134; Strike—the strike price of the option, reference 136; Type—the type of option, meaning whether it is a call or put (in the preferred embodiment the background is color coded one color (blue) for calls and another color (red) for puts), reference 138; bid—the number of contracts on the bid price (in the preferred embodiment, the font is color coded for exchange identification), reference 140; Bid—the price of the option bid (in the preferred embodiment, the font is color coded for exchange identification), reference 142; Theo—the current theoretical option value based on user defined variables, reference 144; Dlt—the delta, otherwise known as the hedge ratio of an option, reference 146; Ask—the current offering or ask price of an option (the font is color coded for exchange identification), reference 148; ask—the number of contracts on the ask price (the font is color coded for exchange identification), reference 150; Dlt—another column showing the delta of the option, reference 152; Id—an internal identification reference number for the trade, reference 154; and Name—another column showing the symbol for the security, reference 156.

Figure 7C:
FIG. 7 is a screen shot of a computer display of a main menu of the crossed and locked window showing filtering by an exchange.

As shown in FIG. 7, the display of the crossed and locked window 120 may be filtered by national exchange, as indicated at 160, so that the liquidity provider can select or deselect one or more of the exchanges for display. By selecting the exchange name from the menu 160, data from that exchange is displayed. As many or as few exchanges may be selected by the user. In the illustrated example, all of the available exchanges are selected, as noted by the check mark adjacent each name. The additional information is displayed and additional commands are available as shown in button bars 162 and 164.

Turning to FIG. 8, the liquidity provider or other user may filter the display 120 by expiration month, selecting or deselecting as many of the available expiration months as desired, as indicated at 168. All of the available expiration dates are selected, as indicated by the check marks. The pull down list, as with others of this type, list all of the entries available for selection.

With reference to FIG. 9, the liquidity provider or other user has the ability to filter the display of the crossed and locked window 120 to select or deselect the securities shown. In the example, the pull down menu 172 lists the securities by symbol, and all but one of the available securities is checked.

The components of the list displayed in the window 120 are defined as trading opportunities and are sorted in real time in any number of user-defined criteria. The sort criteria can include sorting alphabetically, by time, by theoretical profit, and the like. Trading opportunities may be filtered to exclude symbols (or investment instruments) that the user is not interested in trading. The filtering can be performed based on a number of different criteria. In exemplary embodiments, the filtering is performed by expiration months, calls/puts, stock symbols, inventory, and delta. The system displays the trading opportunity (including, but not limited to, such information as price, quantity available at the price, originating exchanges, and theoretical profit helper contract, which may be adjusted by a multiplier) and allows the liquidity provider to either: a) manually route the order by clicking with the mouse or other pointer to activate an order screen, b) automatically route the order based on predetermined criteria set by the liquidity provider that would allow the generation of an automatic order or, c) adjust the user's theoretical input mechanism (either manually or automatically) to account for the observed change in market conditions. The order is an electronic data transmission to the exchange identifying the instrument, a price and a quantity. Generally there is a confirmation from the exchange of receipt of the order.

Thus, a crossed/locked/one tick away system and method is provided. This is a system for aggregating, sorting, displaying and trading option market quotes from a portfolio of identified securities. A user's bid may be as derived from the quoting system or the bid on the user's home exchange is higher than, equal to, or one quote increment different than the offer on another exchange. A user's offer may be as derived from the quoting system or the offer on the user's home exchange is higher than, equal to, or one quote increment different than the bid on another exchange. It is also foreseen that the one tick away screen could be set to more than one tick away by a user setting. For instance, the user may chose to view quotes that are two ticks away. The home exchange may be defined if not set by the user quote.

Inverted Window

Figure 10A:
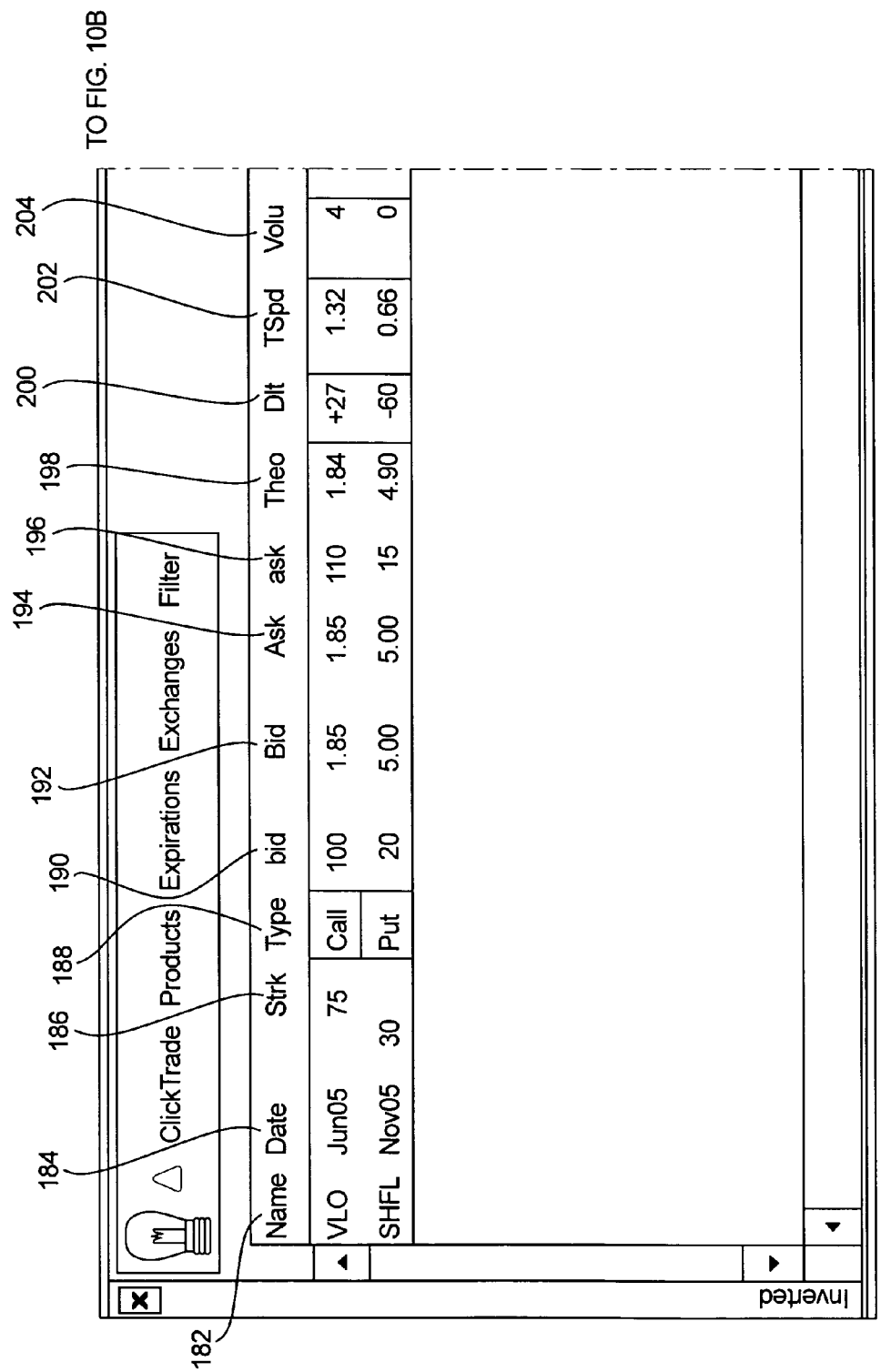
FIG. 10 is a screen shot of a computer display of an inverted window of the quote aggregate displays.
Figure 10B:
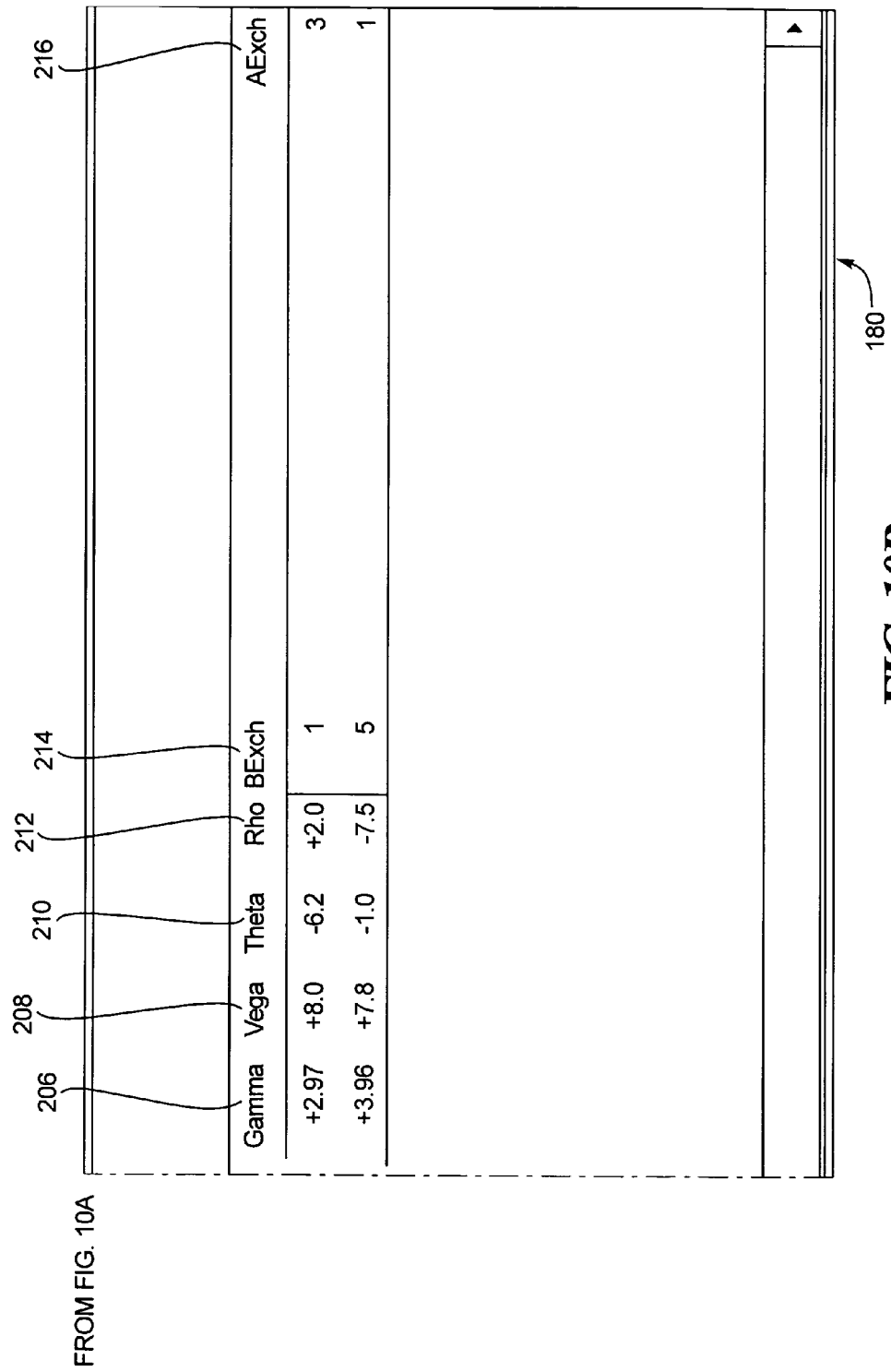

Turning now to FIG. 10, some liquidity providers prefer to look as the data from the exchanges from yet another perspective. An inverted window 180 is provided wherein is shown option markets where the bid on any national exchange is greater than or equal to the offer on another exchange in any portfolio security, in other words, the market is inverted or crossed. The data displayed in the inverted window 180 is filtered by securities, the filtering being determined by the user. The inverted window 180 displays the best markets for each exchange for the displayed securities. As compared to the crossed/locked/one away window which displays information based on the user's primary exchange, the inverted window 180 shows crossed or inverted quotes on any exchange. The liquidity provider may use this information to route one or more orders or simply use the information to modify model assumptions.

As with the other windows, the pricing data is the primary sorting data for this window and is the primary value of concern for the liquidity provider. A typical set of supplemental data that a liquidity provider may consider prior to making a trade decision is shown in the drawing.

The data is displayed in rows and columns, where each column is provided with an identifier, as follows: Name—the name of the option using the security symbol, reference 182; Date—the date of expiration by month and year of the option detected, reference 184; Strk—the strike price of the option, reference 186; Type—the type of option, whether it is a call or put (in the preferred embodiment, the background is color coded one color for calls, and another color for puts), reference 188; bid—the number of contracts on the bid price (in the preferred embodiment, the font is color coded for exchange identification), reference 190; Bid—the price of the option bid (in the preferred embodiment, the font is color coded for exchange identification), reference 192; Ask—the price of the option ask (in the preferred embodiment, the font is color coded for exchange identification), reference 194; ask—the number of contracts on the ask price (in the preferred embodiment, the font is color coded for exchange identification), reference 196; Theo—the theoretical value of the option, which is user defined, reference 198; Dlt—the delta of the option, reference 200; Tspd, reference 202; Volu—the number of contracts traded during market inversion, reference 204; Gamma—the gamma function amount for the option, reference 206; Vega—the amount of vega function per option, reference 208; Theta—the amount of theta per option, reference 210; Rho—the amount of rho per option, reference 212; BExch—an identification of exchange bid for the option for which a numerical designation is provided, reference 214; and AExch—an identification of exchange ask for option, for which a numerical designation is provided, reference 216.

Figure 11:
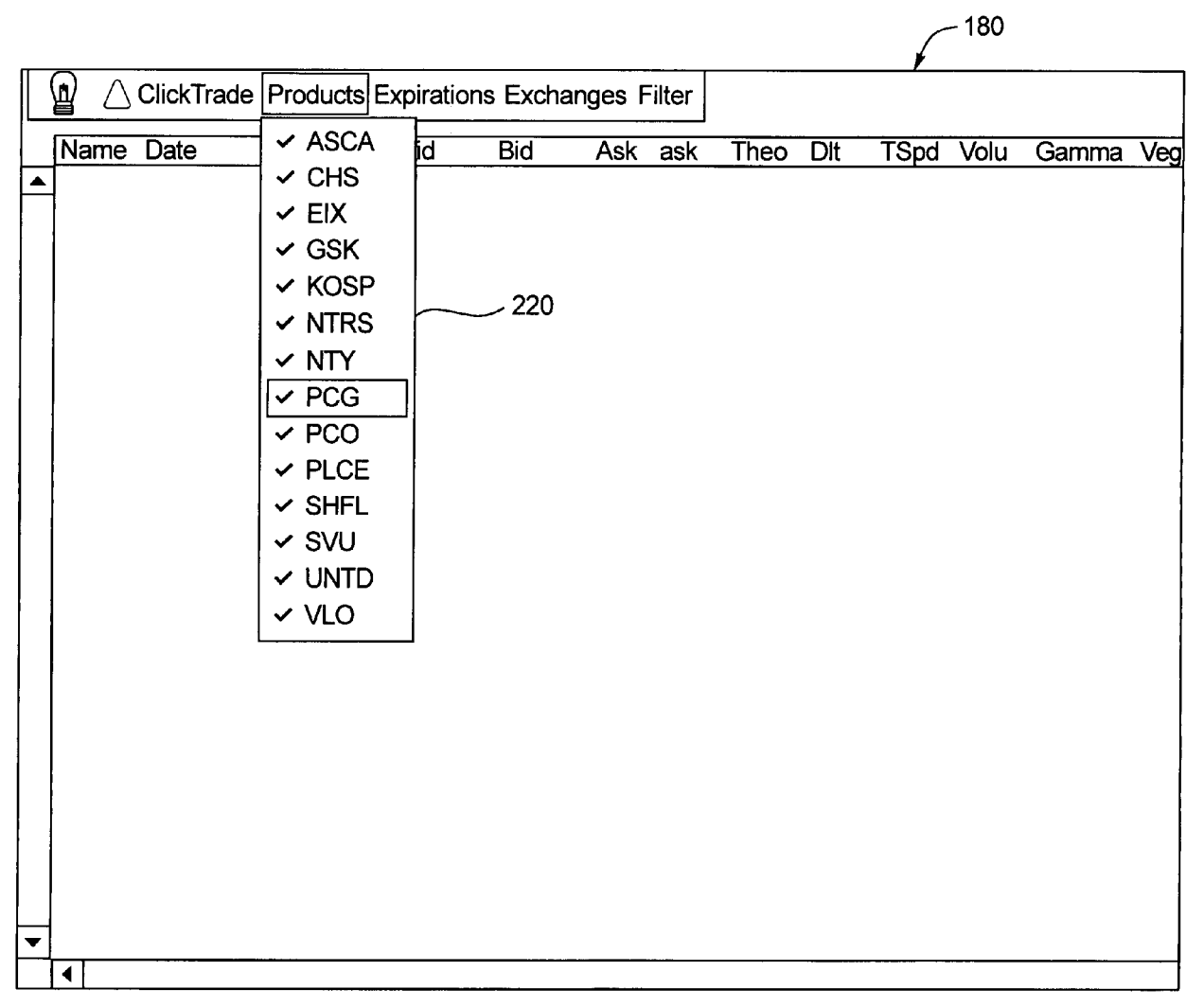

As shown in FIG. 11, the liquidity provider or user can filter the inverted window 180 by product security, as indicated by the pull down menu at 220. All of the available securities are checked in the illustrated example.

Figure 12:
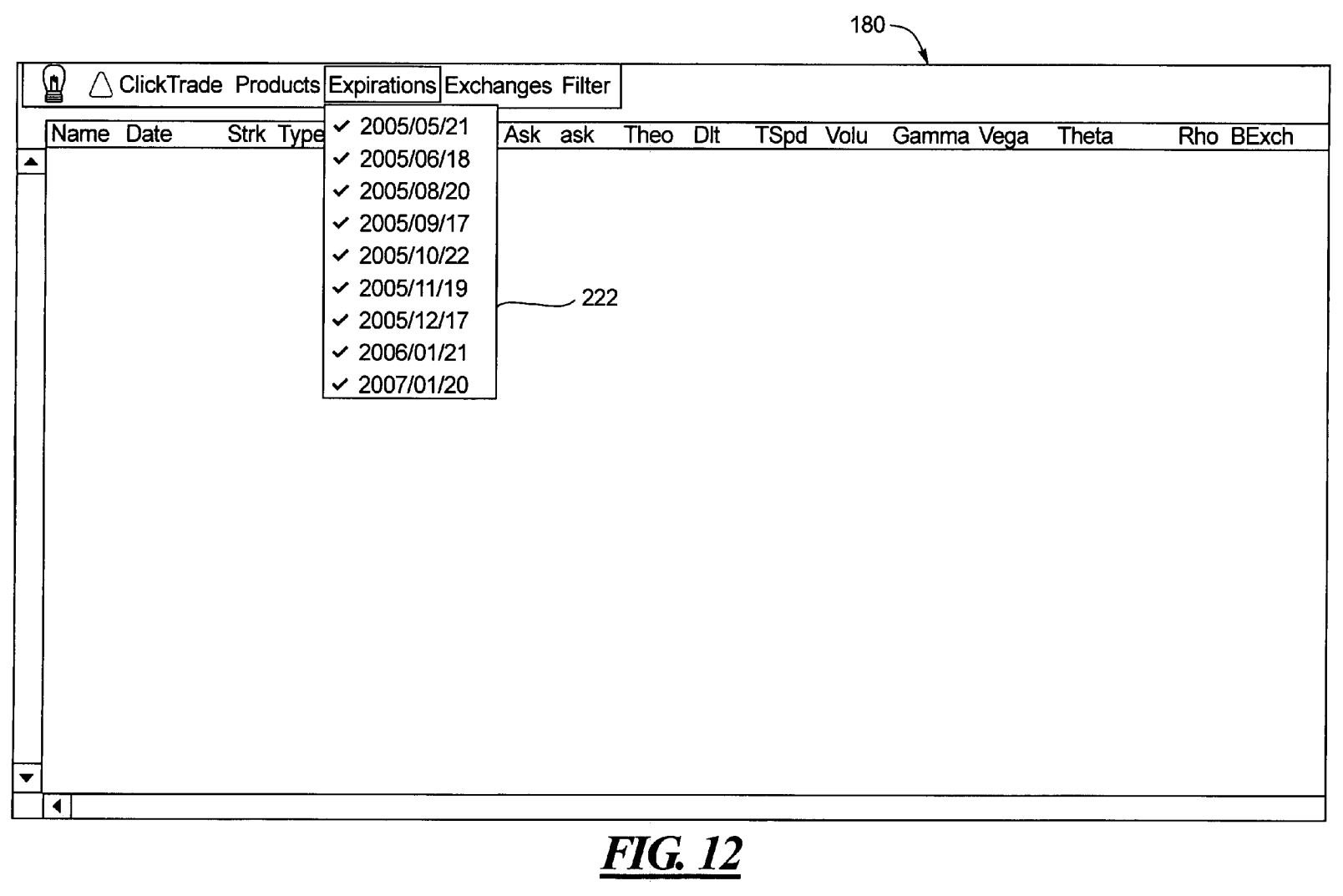

With reference to FIG. 12, the liquidity provider or user may filter the inverted window 180 display by expiration date, as indicated by the pull down menu at 222. All of the available dates have been selected.

Figure 13A:
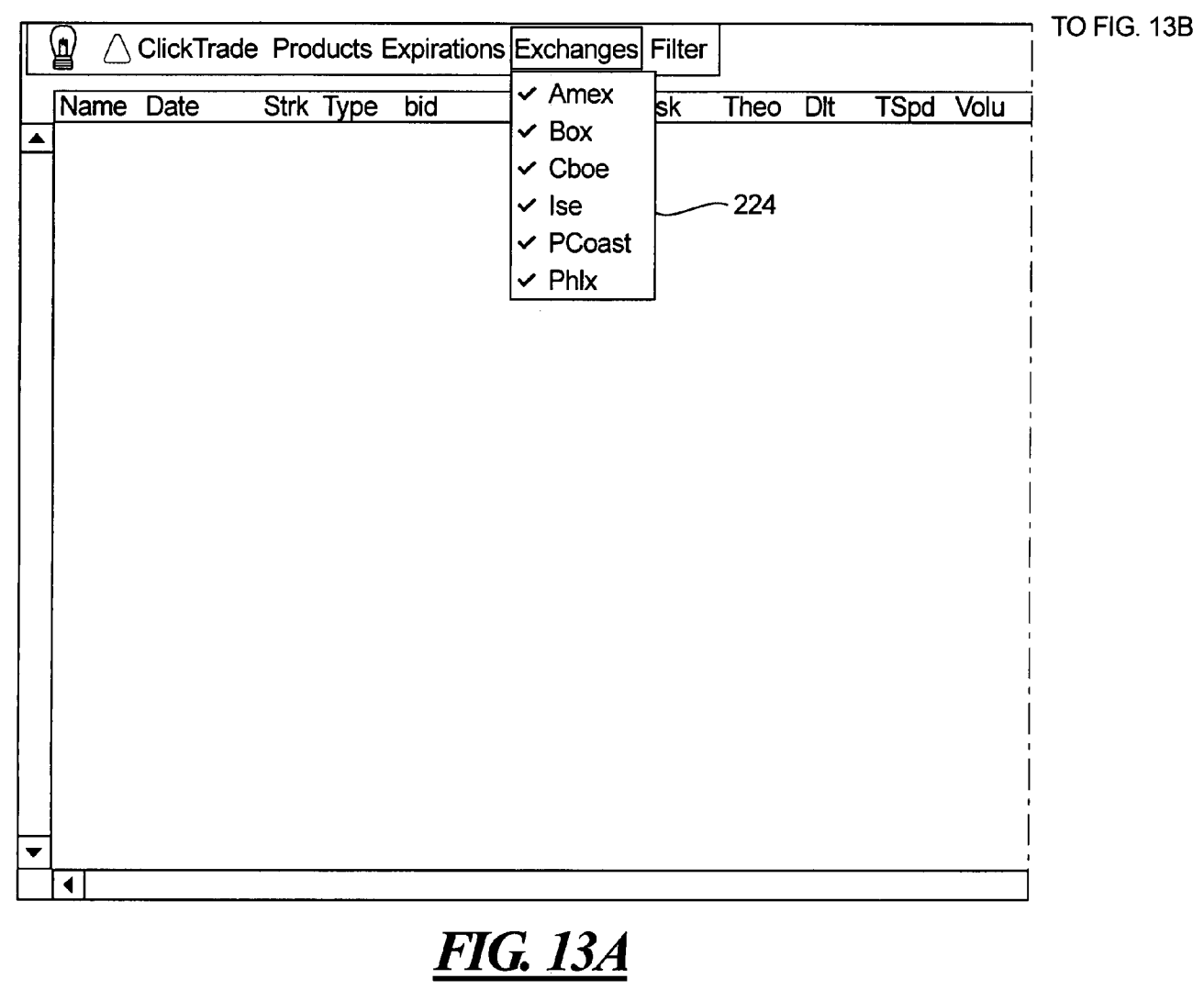
Figure 13B:
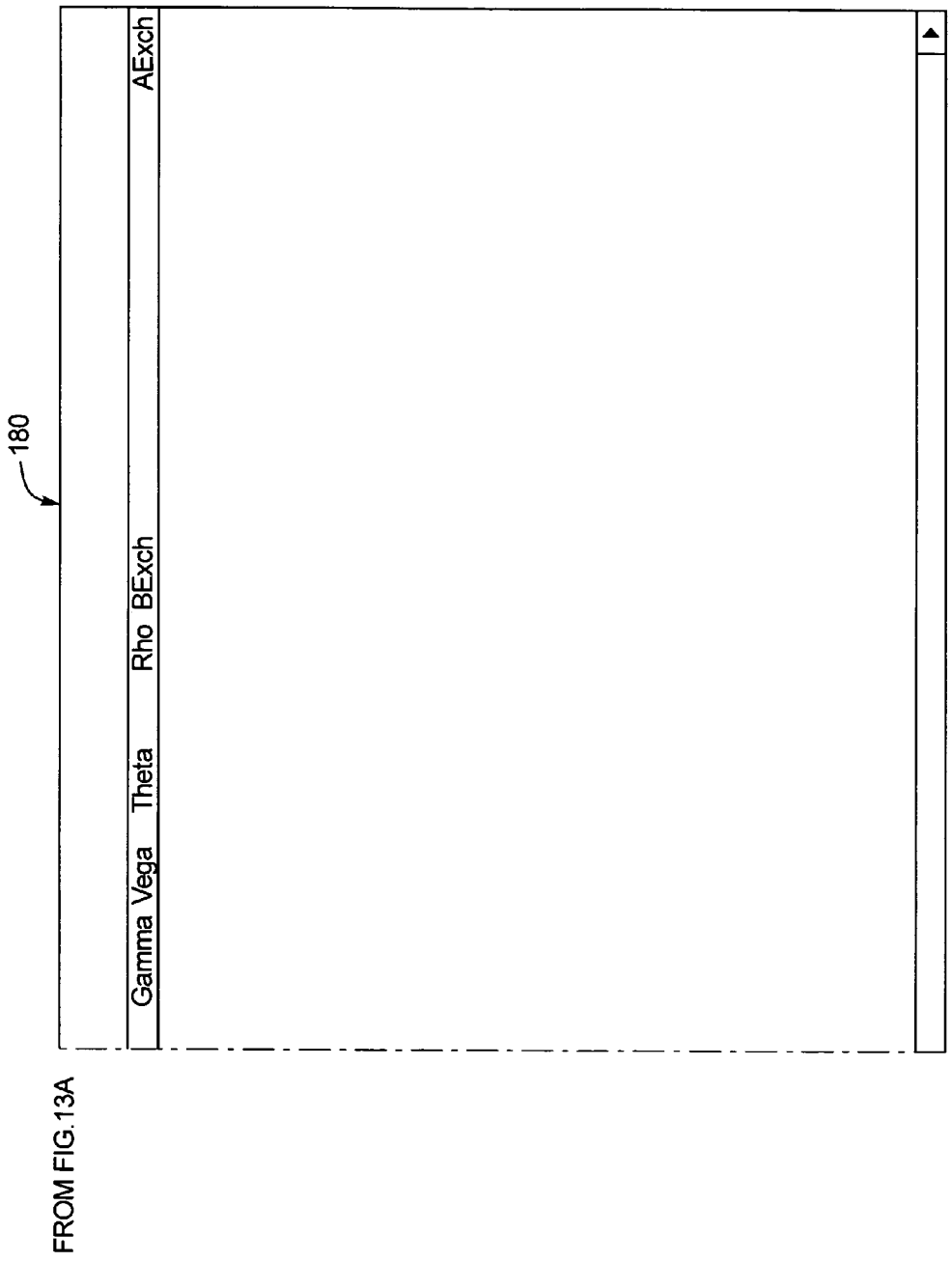
FIG. 13 is a screen shot of a computer display of the inverted window filtered by national exchange.

FIG. 13 shows the inverted window 180 as the user is electing to filter the display by national exchange, as indicated by the pull down menu at 224. These examples of filtering apply to the other windows of the present system as well.

Figure 14A:
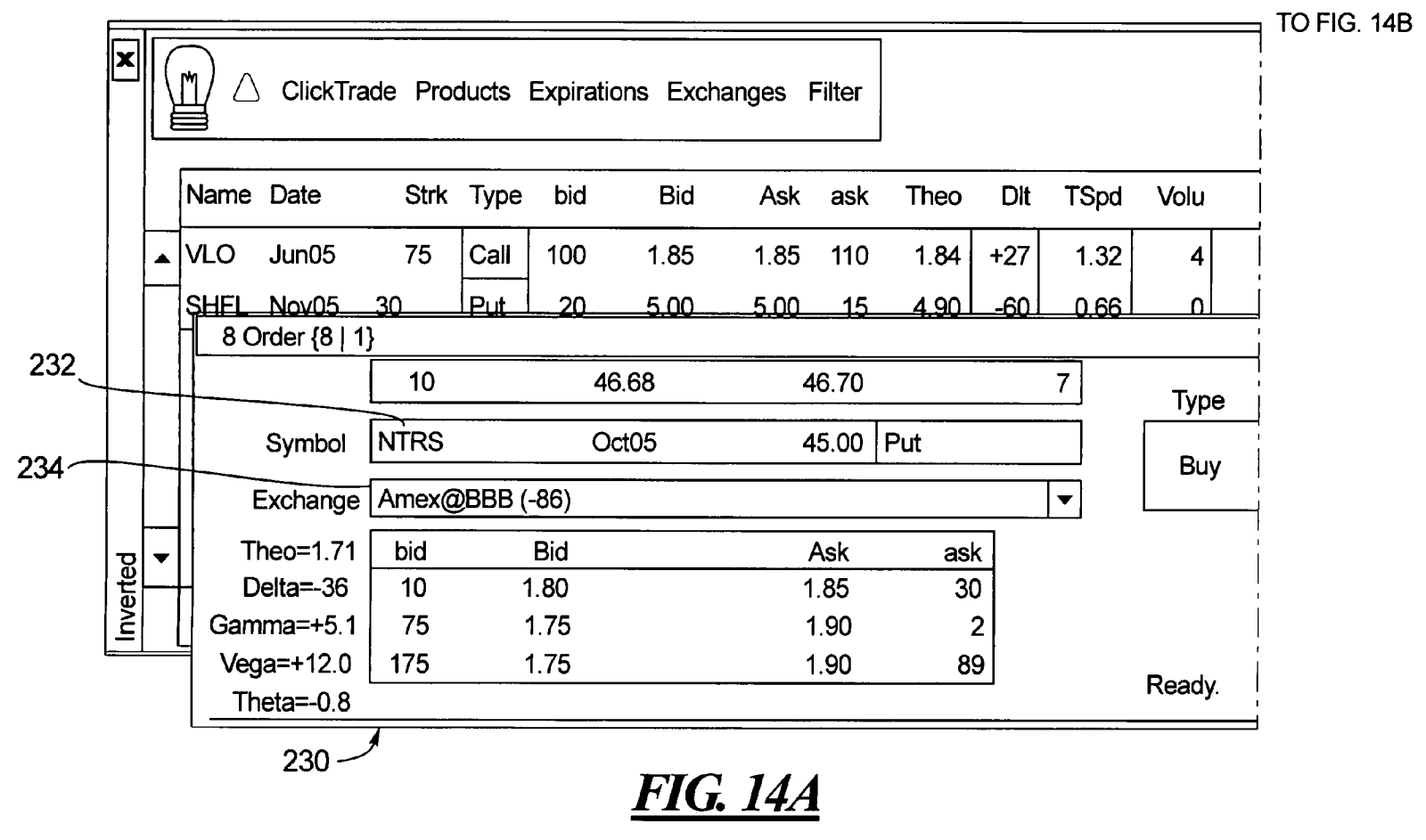
Figure 14B:
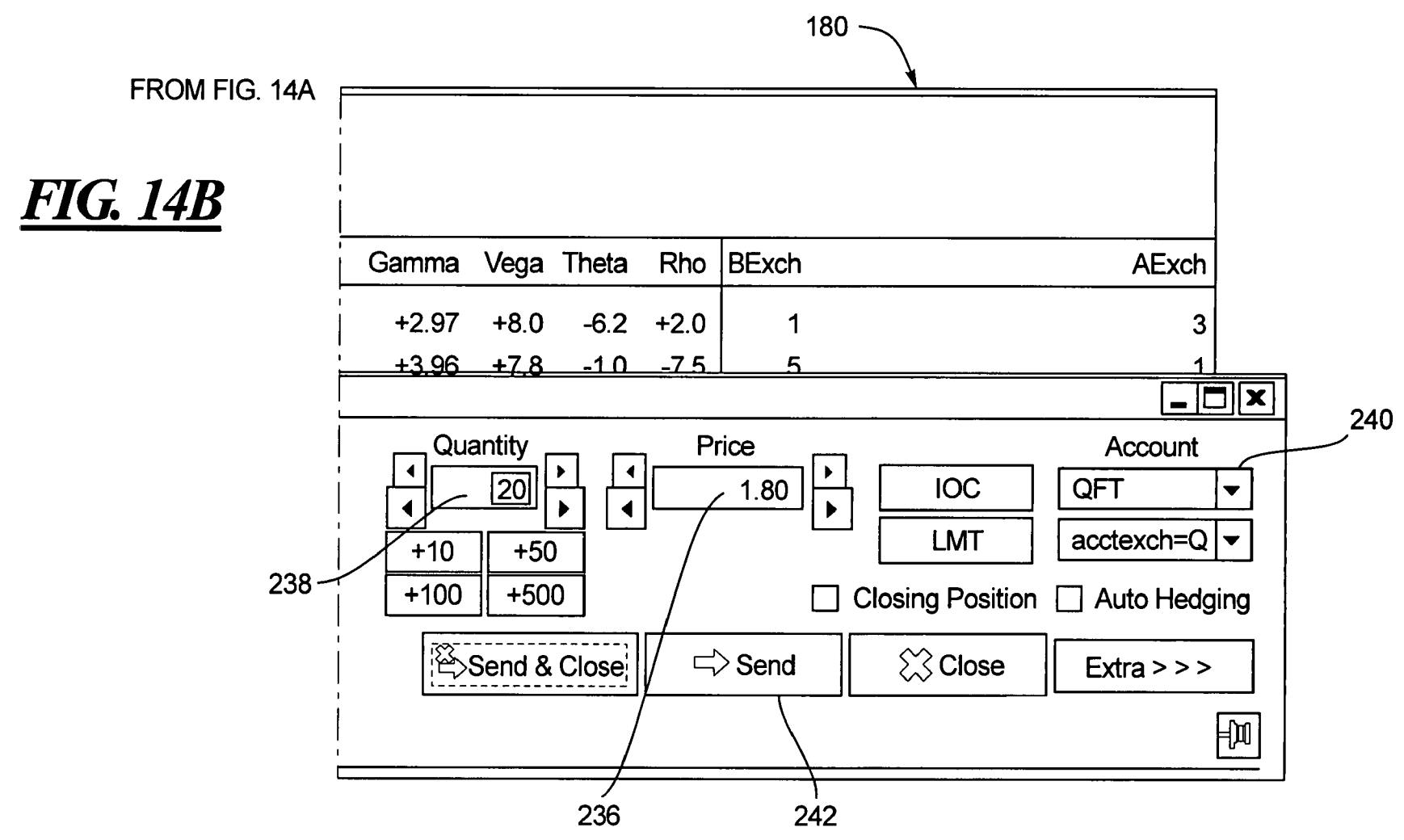

As with the other displays provided in the preferred embodiment, it is possible to select an entry row in the inverted window 180 and make a trade on the tradable interest shown in that row. FIG. 14 shows that a liquidity provider may select an option listing in the inverted window 180, such as by clicking with a mouse pointer or other pointing device, which opens up an order entry window 230 similar to the order window opened while using the other windows in the present system and method. The order entry window 230 is automatically populated with data identifying the tradable interest 232 selected by the liquidity provider 24. For instance, the proper exchange to which the trade is being submitted is automatically entered at 234, as is the price 236, quantity 238 and account 240, as well as any other required or optional information. The liquidity provider may select the send button 242 to send this trade to the exchange, or may modify it prior to sending.

Similar order entry windows are provided on each of the displays of the present system and method. Alternatively, the user may configure the system for one click trading. In view of the brief time that inverted market conditions exist for a tradable interest, the user may prefer the one click trading configuration.

The inverted display or window 180 is a system and method for aggregating, sorting, displaying and trading option market quotes from a portfolio of identified securities where the bid on any exchange for a particular option as derived from the market data source is higher than or equal to the offer on another exchange as derived from the market data source. The components of the list are defined as trading opportunities and are real-time sorted in any number of user-defined methods such as alphabetically, by time, by theoretical profit, and the like. Trading opportunities may be filtered to exclude symbols that the user is not interested in trading. The filtering can be performed based on a number of different criteria. In exemplary embodiments, the filtering is performed by expiration months, calls/puts, stock symbols, inventory, or delta. The system displays the trading opportunity (including, but not limited to, such information as price, quantity available at the price, originating exchanges, theoretical profit per contract (adjusted by a multiplier) and allows the liquidity provider to either: a) manually route the order by clicking with the mouse or other pointer to activate an order screen, b) automatically route the order based on pre-describing the criteria that would allow the generation of an automatic order, or c) adjust the theoretical input mechanism (either manually or automatically) to account for the observed change in market conditions. The order that is sent includes the components of the order noted above.

Thus, there is shown and described a system and method that includes one or more of the forgoing windows or displays. Any one of the displays is provided. If more that one of the present windows or displays is provided for use by a liquidity provider, the system preferably enables the user to chose which one or ones of the windows is displayed. The user may chose the tools that are the most valuable to him or her.

The method and system is about condensing information and presenting the data to the liquidity provider that the liquidity provider would otherwise likely miss. The liquidity provider may pick any variable and use that to make a decision. The present system and method places that selected variable and the data associated with it before the liquidity provider, what ever the operable variable is. In the illustrated example, the variable is pricing data. Other variable data may be used instead.

According to further aspects of the invention, protocol filtering is performed. Examples of protocol filtering include: expiration dates (for example, so that the display only list options that expire within 360 days), symbols (so that the display lists all options in the portfolio other than those related to one or more particular symbols), exchanges (so that the display does not include quotes coming from a particular exchange), and type of transaction (so that the display only includes opportunities to buy (or sell)).

Other tools envisioned for inclusion with the present method and system, and are described hereinafter. One or more of these additional tools may be provided as part of a system or suite of tools, or they may be provided individually.

A spread window may be provided that enables a user to click to populate the window and that provides a real-time theoretical, order-routing from the window. The spread window may display cross-product spread, be simultaneous to multiple exchanges, and provide quantity interval routing.

An account window may be provided to compare yesterday (in other words, the preceding trading day) to today in the system using the opening quantity reported from the clearer. The account window preferably generates difference messages. For example, a black highlight in the window and a message of the day message may be provided.

A trade log may be included to log trading that has occurred, including recording edge per trade, actual to theoretical values, summarized edge by account, an identifier of the liquidity that made the trade, the counter-party (other party to the trade), and the like.

An auto hedge feature may also be provided, as shown in the order windows. A P&L (profit and loss) risk feature having a real-time premium over parity, a normalized risk aggregation, and an activate risk scenario may be directly obtained from the window. An auto-switch quote feeds feature may be included. Keyboard lean shortcuts may be included in the system. A click on tab feature that causes all windows to change is envisioned for inclusion in the system. Another feature is an intra-day decay, that is user customized. A maturities window float, in which inputs and a summary of maturities is displayed is contemplated. Another feature for inclusion within the present system is speed bumps. The preferred display will auto-fit on the liquidity provider's screen.

Others features include: Route orders from the valuation GUI and Smart routing.

The present software runs on a computer system such as a computer operating under a windows-type operating environment. The software is stored on computer readable media and may be transferred from one computer to another, such as over a network. The software is preferably operating on a secure network. A system including the software and hardware may be provided. The software performs the methods of the present invention, including for example, the method steps described in conjunction with this description.

Thus, the various displays of present method and apparatus permit a liquidity provider to handle 60 or more stocks at one time on one computer. This may represent well more than 3000 derivative securities. The display condenses into one screen what has previously taken 60 or more screens to show. The best opportunities are presented at the top of each display as a result of filtering for the best opportunity.

Although other modifications and changes may be suggested by those skilled in the art, it is the intention of the inventors to embody within the patent warranted hereon all changes and modifications as reasonably and properly come within the scope of their contribution to the art.

I claim:

1. A method for display of trading information from an exchange or other trading provider or venue, comprising the steps of:
    receiving trading information on a computer system from the exchange or other trading provider or venue for a plurality of tradable interests, said trading information including current pricing data of the tradable interests;
    receiving portfolio information on the computer system of tradable interests in a portfolio of a user, wherein said user is a market maker type liquidity provider;
    receiving theoretical value information for at least some of the tradable interests in the portfolio of the user;
    automatically filtering said trading information from the exchange or other trading provider or venue utilizing said portfolio information of the user using the computer system;
    automatically comparing said trading information with said theoretical value information based on the pricing data as a comparison criteria using the computer system to provide comparison data;
    sorting said comparison data based on a difference between said theoretical value information and the pricing data of the corresponding tradable interest from the exchange or other trading provider or venue;
    dynamically displaying to said market maker type liquidity provider any of said trading information remaining after said filtering and comparing steps as display data on a display apparatus of the computer system, said displaying step displaying said trading opportunities for the market maker type liquidity provider with corresponding pricing data and with corresponding supplemental data to enable the user to decide on an action based on the displayed data, said dynamically displaying step including updating the display data of the tradable interests is received from the exchange or other trading provider or venue, wherein said step of displaying further includes:
        displaying as most significant trading information that has pricing data from the exchange or other trading provider or venue that varies to a greatest extent from said theoretical information; and
        displaying as less significant trading information that has pricing data from the exchange or other trading provider or venue that varies to a lesser extent from said theoretical information; and
    at least one of the following steps:
        receiving an instruction from the user to route an order;
        automatically routing an order on behalf of the user based on pre-described criteria; and
        receiving an adjustment to a theoretical value mechanism to account for changes in market conditions.

2. A method as claimed in claim 1, further comprising the step of:
    accepting a selection by a user of a tradable interest displayed in said displaying step; and
    transmitting a quote to an exchange corresponding to said selection.

3. A method as claimed in claim 1, wherein said exchange or other trading provider or venue comprises a plurality of exchanges or other trading providers or venues and said step of receiving trading information receives trading information from a plurality of the exchanges or other trading providers or venues.

4. A tangible computer readable media on which is recorded a computer program that is operable on a computer to perform the method comprising the steps of:
    receiving trading information from an exchange or other trading provider or venue for a plurality of tradable interests, said trading information including current pricing information of the tradable interests;
    receiving portfolio information of tradable interests in a portfolio of a user, wherein said user is a market maker type liquidity provider;
    receiving theoretical value information for at least some of the tradable interests in the portfolio of the user;
    filtering said trading information from the exchange or other trading provider or venue with said portfolio information of the user;
    comparing said trading information by the pricing data as a comparison criteria, said comparing step including comparing said trading information by said theoretical value information to provide comparison data;

sorting said comparison data by a difference between said theoretical value information and the pricing data of the corresponding tradable interest from the exchange or other trading provider or venue; and displaying any of said trading information remaining after said filtering and comparing steps as display data, said displaying step including displaying the trading opportunities with the corresponding pricing data and with corresponding supplemental data to enable the market maker type liquidity provider user to decide on an action based on the displayed data, said display being updated dynamically as trading information of the displayed tradable interests is received from the exchange or other trading provider or venue, wherein said step of displaying further includes:

displaying as most significant trading information that has pricing data from the exchange or other trading provider or venue that varies to a greatest extent from said theoretical information; and displaying as less significant trading information that has pricing data from the exchange or other trading provider or venue that varies to a lesser extent from said theoretical information; and at least one of the following steps:

receiving an instruction from the user to route an order;

automatically routing an order on behalf of the user based on pre-described criteria; and receiving an adjustment to a theoretical value mechanism to account for changes in market conditions.

5. A method for display of trading information from an exchange or other trading provider or venue, comprising the steps of:

receiving trading information of trading opportunities on a computer system from the exchange or other trading provider or venue for a plurality of tradable interests, said trading information including pricing data of the tradable interests;

receiving portfolio information on the computer system of tradable interests in a portfolio of a user wherein the user is a market maker type liquidity provider;

receiving theoretical value information on the computer of the tradable interests in the portfolio of the user;

filtering said trading information from the exchange or other trading provider or venue with said portfolio information of the user using the computer system;

comparing said trading information with the theoretical value information for corresponding ones of the tradable interests using the computer system; and dynamically displaying any of said trading information remaining after said filtering and comparing steps as display data on a display apparatus of the computer system, said displaying step including sorting said display data by an extent to which the pricing data differs from the theoretical value information for corresponding tradable interests, said display data including pricing data and theoretical value information of the tradable interests to enable the user to decide on an action based on the displayed data, said dynamically displaying step including updating the display data as additional trading information of the displayed tradable interests is received from the exchange or other trading provider or venue, wherein said step of dynamically displaying further includes:

displaying as most significant trading information that has pricing data from the exchange or other trading provider or venue that varies to a greatest extent from said theoretical information; and displaying as less significant trading information that has pricing data from the exchange or other trading provider or venue that varies to a lesser extent from said theoretical information; and at least one of the following steps:

receiving an instruction from the user to route an order;

automatically routing an order on behalf of the user based on pre-described criteria; and receiving an adjustment to a theoretical value mechanism to account for changes in market conditions.

\* \* \* \* \*